United States Patent
Priyadarshi et al.

(10) Patent No.: US 10,860,328 B2
(45) Date of Patent: Dec. 8, 2020

(54) PROVIDING LATE PHYSICAL REGISTER ALLOCATION AND EARLY PHYSICAL REGISTER RELEASE IN OUT-OF-ORDER PROCESSOR (OOP)-BASED DEVICES IMPLEMENTING A CHECKPOINT-BASED ARCHITECTURE

(71) Applicant: QUALCOMM Incorporated, San Diego, CA (US)

(72) Inventors: Shivam Priyadarshi, Morrisville, NC (US); Rodney Wayne Smith, Raleigh, NC (US); Yusuf Cagatay Tekmen, Raleigh, NC (US); Luke Yen, Woodinville, WA (US)

(73) Assignee: Qualcomm Incorporated, San Diego, CA (US)

( * ) Notice: Subject to any disclaimer, the term of this patent is extended or adjusted under 35 U.S.C. 154(b) by 92 days.

(21) Appl. No.: 16/138,011

(22) Filed: Sep. 21, 2018

(65) Prior Publication Data
US 2020/0097296 A1 Mar. 26, 2020

(51) Int. Cl.
*G06F 7/38* (2006.01)
*G06F 9/00* (2006.01)
(Continued)

(52) U.S. Cl.
CPC .............. *G06F 9/3863* (2013.01); *G06F 5/06* (2013.01); *G06F 9/3013* (2013.01);
(Continued)

(58) Field of Classification Search
CPC ........ G06F 9/3863; G06F 5/06; G06F 9/3013; G06F 9/30141; G06F 9/3842; G06F 9/3857
(Continued)

(56) References Cited

U.S. PATENT DOCUMENTS 7,529,913 B2 5/2009 Sodani et al.
8,078,854 B2 12/2011 Vick et al.
(Continued)

OTHER PUBLICATIONS

Akkary, Haitham et al., "Checkpoint Processing and Recovery: An Efficient, Scalable Alternative to Reorder Buffers," IEEE Micro, vol. 23, No. 6, Nov. 2003, pp. 11-19.
(Continued)

*Primary Examiner* — Chun Kuan Lee
(74) *Attorney, Agent, or Firm* — Withrow & Terranova, PLLC

(57) ABSTRACT

Providing late physical register allocation and early physical register release in out-of-order processor (OOP)-based devices implementing a checkpoint-based architecture is provided. In this regard, an OOP-based device provides a register management circuit that is configured to employ a combination of the checkpoint approach and the virtual register approach. The register management circuit includes a most recent table (MRT) for tracking mappings of logical register numbers (LRNs) to physical register numbers (PRNs), a physical register file (PRF) storing information for physical registers, a virtual register file (VRF) storing data for virtual registers, and a checkpoint queue for tracking active checkpoints (each of which is a snapshot of the MRT at a given time). The register management circuit applies checkpoint selection criteria for balancing the number of checkpoints, and implements late physical register allocation using virtual registers to provide an effectively larger physical register file and checkpoint-based early release of physical registers.

42 Claims, 21 Drawing Sheets

(51) Int. Cl.
*G06F 9/44* (2018.01)
*G06F 9/38* (2018.01)
*G06F 5/06* (2006.01)
*G06F 9/30* (2018.01)

(52) U.S. Cl.
CPC ........ *G06F 9/30141* (2013.01); *G06F 9/3842* (2013.01); *G06F 9/3857* (2013.01)

(58) Field of Classification Search
USPC .......................................................... 712/228
See application file for complete search history.

(56) References Cited

U.S. PATENT DOCUMENTS

| | | |
|---|---|---|
| 2005/0120191 A1 | 6/2005 | Akkary et al. |
| 2012/0278592 A1 | 11/2012 | Tran |
| 2014/0040595 A1 | 2/2014 | Tran |
| 2018/0239604 A1* | 8/2018 | Cain, III ............... G06F 9/3851 |

OTHER PUBLICATIONS

Cristal, Adrian et al., "Out-of-Order Commit Processors," HPCA '04 Proceedings of the 10th International Symposium on High Performance Computer Architecture, 2004, 12 pages.

Gonzalez, Antonio et al., "Virtual-Physical Registers," HPCA '98 Proceedings of the 4th International Symposium on High-Performance Computer Architecture, 1998, 10 pages.

Monreal, Teresa et al., "Late Allocation and Early Release of Physical Registers," IEEE Transactions on Computers, vol. 53, No. 10, Oct. 2004, pp. 1244-1259.

Postiff, Matthew et al., "Integrating Superscalar Processor Components to Implement Register Caching," ICS '01 Proceedings of the 15th international conference on Supercomputing, 2001, pp. 348-357.

International Search Report and Written Opinion for PCT/US2019/051972, dated Jan. 7, 2020, 12 pages.

* cited by examiner

REGISTER MANAGEMENT CIRCUIT (126)

- REGISTER MANAGEMENT CONTROL LOGIC (200)
- PHYSICAL REGISTER FILE (PRF) (204)
- CHECKPOINT QUEUE (208)
- MOST RECENT TABLE (MRT) (202)
- VIRTUAL REGISTER FILE (VRF) (206)
- PHYSICAL REGISTER NUMBER (PRN) OBSOLETE LIST (212)
- PHYSICAL REGISTER NUMBER (PRN) FREE LIST (216)
- VIRTUAL REGISTER NUMBER (VRN) OBSOLETE LIST (210)
- VIRTUAL REGISTER NUMBER (VRN) FREE LIST (214)
- MINIMUM INSTRUCTION COUNT THRESHOLD (218)
- MAXIMUM INSTRUCTION COUNT THRESHOLD (220)
- MAXIMUM CHECKPOINT COUNT THRESHOLD (222)
- BRANCH MISPREDICTIONS PER THOUSAND INSTRUCTIONS (PKI) RATE (224)
- MINIMUM BRANCH MISPREDICTION THRESHOLD (226)
- MAXIMUM BRANCH MISPREDICTION THRESHOLD (228)

*FIG. 2*

PROVIDING LATE PHYSICAL REGISTER ALLOCATION AND EARLY PHYSICAL REGISTER RELEASE IN OUT-OF-ORDER PROCESSOR (OOP)-BASED DEVICES IMPLEMENTING A CHECKPOINT-BASED ARCHITECTURE

BACKGROUND

I. Field of the Disclosure

The technology of the disclosure relates generally to instruction dispatching, and, in particular, to instruction dispatching in out-of-order processor (OOP)-based devices.

II. Background

Out-of-order processors (OOP) are computer processors that are capable of executing computer program instructions in an order determined by an availability of each instruction's input operands, regardless of the order of appearance of the instructions in the computer program being executed. By dispatching and executing instructions out-of-order, an OOP may be able to fully utilize processor clock cycles that otherwise would go wasted while the OOP waits for data access operations to complete. The degree of instruction-level parallelism (i.e., the number of instructions that can be executed simultaneously) and memory-level parallelism (i.e., the number of pending memory operations being performed simultaneously) achievable by the OOP may depend in large part on the number of physical registers available for use by the OOP. The number of physical registers, in turn, may depend on the size of the physical register file (PRF) in which the physical registers are stored. A larger PRF enables the OOP to use a larger out-of-order instruction window, thus improving processor performance by increasing processor throughput as measured in instructions executed per processor cycle. However, the use of a larger PRF may prevent the OOP from employing higher processor clock frequencies, which may negatively impact processor performance. Thus, it is desirable to provide the OOP with an effectively larger number of physical registers without actually increasing the size of the PRF.

One approach to providing an effectively larger number of physical registers is based on the fact that, in conventional OOPS, physical registers are allocated early in an execution pipeline during register renaming, but are not released until very late in the execution pipeline after a writeback stage. In practice, though, the physical register is generally used only for dependency tracking in the interim between renaming and writeback. Some OOPs thus provide virtual registers that are allocated during the rename stage, but that do not require any physical storage. Under the virtual register approach, a physical register is not allocated until an instruction in the execution pipeline is ready to perform a writeback operation. However, the use of virtual registers may give rise to deadlock situations (in which an older instruction is waiting for a physical register, but all physical registers have been consumed by younger instructions) when in-order retirement of the instructions is used. A deadlock causes the OOP to flush the younger instructions from the execution pipeline, resulting in decreased instruction throughput and processor performance.

Another approach uses checkpoints in an attempt to enable more aggressive release of physical registers. Using this approach, a record of the most recent logical-to-physical register mappings are periodically checkpointed when executing low-confidence branches, and a physical register is released between two checkpoints as soon as a new logical mapping for the physical register is produced, all consumer instructions have read the data stored in the physical register, the physical register is not a part of any pending checkpoints, and the physical register is not the most recent mapping of the corresponding logical mapping. The OOP can also use the checkpoints to recover from exceptions or branch mispredictions by restarting execution from the checkpoint immediately preceding the instruction that caused the exception or misprediction. However, the effectiveness of the checkpoint-based approach is dependent on the number of checkpoints created, as well as the number of active checkpoints at a given point in time. Too few checkpoints may result in a larger number of re-executed instructions, which can be detrimental to processor performance. Conversely, too many checkpoints may hinder the release of physical registers, which defeats the purpose of using the checkpoints in the first place.

SUMMARY OF THE DISCLOSURE

Aspects disclosed in the detailed description include providing late physical register allocation and early physical register release in out-of-order processor (OOP)-based devices implementing a checkpoint-based architecture. In this regard, in some aspects, an OOP-based device provides a register management circuit that is configured to employ a combination of the checkpoint approach and the virtual register approach. The register management circuit applies a checkpoint selection criteria for balancing the number of checkpoints such that a number of re-executed instructions are minimized, while at the same time keeping a number of checkpointed physical registers and a total number of checkpoints below a specified limit. Additionally, the register management circuit implements late physical register allocation using virtual registers to provide an effectively larger physical register file, which allows more aggressive checkpoint-based early release of physical registers and reduces the probability of deadlock occurrences. To provide this functionality, the register management circuit includes a most recent table (MRT) for tracking most recent mappings of logical register numbers (LRNs) to physical register numbers (PRNs) and virtual register numbers (VRNs), a physical register file (PRF) storing information for each physical register, a virtual register file (VRF) storing data for each virtual register, and a checkpoint queue for tracking active checkpoints (each of which is a snapshot of the MRT at a given time). Some aspects also provide a PRN obsolete list and a VRN obsolete list, which are used respectively to track obsolete PRNs and VRNs (i.e., PRNs or VRNs for which a corresponding logical mapping is newly produced, and for which it is certain that new producer instructions will commit). In this manner, the OOP-based device may realize the benefits provided by the use of both virtual registers and checkpoints, thus improving processor performance.

In another aspect, an OOP-based device implementing a checkpoint-based microarchitecture is provided. The OOP-based device comprises an OOP that comprises an execution pipeline that provides a plurality of processing stages, and also comprises a register management circuit that is communicatively coupled to the execution pipeline. The register management circuit comprises a MRT that provides a plurality of MRT entries each comprising a VRN field, a PRN field, and a valid PRN indicator. The register management circuit further comprises a PRF that provides a plurality of PRF entries each corresponding to a PRN and comprising a PRN active checkpoint count field. The register management circuit also comprises a VRF that provides a plurality of VRF entries each corresponding to a VRN and comprising a VRN active checkpoint count field. The register management circuit additionally comprises a checkpoint queue comprising a first-in-first-out (FIFO) queue configured to store a plurality of checkpoints each comprising an MRT snapshot. The register management circuit is configured to determine whether a checkpoint creation criteria is satisfied. The register management circuit is further configured to, responsive to determining that the checkpoint creation criteria is satisfied, create a checkpoint comprising an MRT snapshot in the checkpoint queue. The register management circuit is also configured to increment the VRN active checkpoint count field of the plurality of VRF entries of the VRF for each VRN field indicated by the plurality of MRT entries of the MRT. The register management circuit is additionally configured to increment the PRN active checkpoint count field of the plurality of PRF entries of the PRF for each PRN field indicated by the plurality of MRT entries of the MRT having a valid PRN indicator set to true.

In another aspect, a method for providing late register allocation in an OOP-based device implementing a checkpoint-based microarchitecture is provided. The method comprises determining, by a register management circuit of an OOP of the OOP-based device, whether a checkpoint creation criteria is satisfied. The register management circuit comprises a MRT that provides a plurality of MRT entries each comprising a VRN field, a PRN field, and a valid PRN indicator. The register management circuit further comprises a PRF that provides a plurality of PRF entries each corresponding to a PRN and comprising a PRN active checkpoint count field. The register management circuit also comprises a VRF that provides a plurality of VRF entries each corresponding to a VRN and comprising a VRN active checkpoint count field. The register management circuit additionally comprises a checkpoint queue comprising a FIFO queue configured to store a plurality of checkpoints each comprising an MRT snapshot. The method further comprises, responsive to determining that the checkpoint creation criteria is satisfied, creating a checkpoint comprising an MRT snapshot in the checkpoint queue, incrementing the VRN active checkpoint count field of the plurality of VRF entries of the VRF for each VRN field indicated by the plurality of MRT entries of the MRT, and incrementing the PRN active checkpoint count field of the plurality of PRF entries of the PRF for each PRN field indicated by the plurality of MRT entries of the MRT having a valid PRN indicator set to true.

BRIEF DESCRIPTION OF THE FIGURES

FIG. 2 is a block diagram illustrating exemplary constituent elements of a register management circuit of the OOP-based device of FIG. 1;

DETAILED DESCRIPTION

Figure 1:
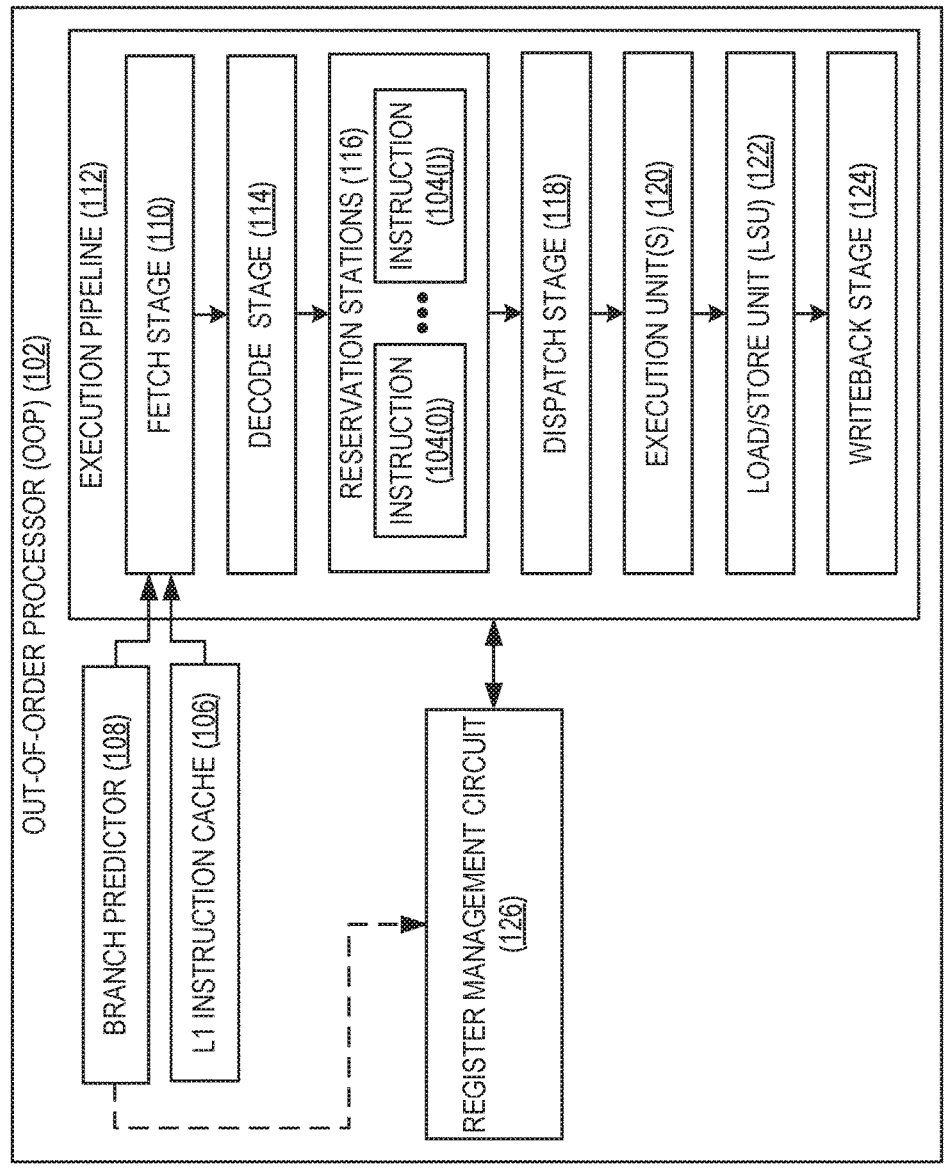
FIG. 1 is a block diagram illustrating an exemplary out-of-order processor (OOP)-based device implementing a checkpoint-based architecture and configured to provide late physical register allocation in out-of-order processor (OOP)-based devices.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing late physical register allocation and early physical register release in out-of-order processor (OOP)-based devices implementing a checkpoint-based architecture. In this regard, FIG. 1 illustrates an exemplary OOP-based device 100 that includes an OOP 102 that implements a checkpoint-based architecture, and that is configured to execute a sequence of instructions 104(0)-104(I). In some aspects, the OOP 102 may be one of multiple processor cores, each executing separate sequences of instructions 104(0)-104(I) and/or coordinating to execute a single sequence of instructions 104(0)-104(I). The OOP 102 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

In exemplary operation, a Level 1 (L1) instruction cache 106 of the OOP 102 may receive instructions (such as the instructions 104(0)-104(I)) that were fetched from a system memory (not shown) for execution. A branch predictor 108 determines a predicted execution path of the instructions 104(0)-104(I), and, based on the predicted execution path, a fetch stage 110 within an execution pipeline 112 retrieves the instructions 104(0)-104(I) and forwards the instructions 104(0)-104(I) to a decode stage 114 for decoding. It is to be understood that the execution pipeline 112 may include more fetch stages 110 and/or more decode stages 114 than illustrated in FIG. 1.

After decoding, the instructions 104(0)-104(I) are sent to one of a plurality of reservation stations 116 pending execution. The reservation stations 116 in some aspects may hold the instructions 104(0)-104(I) until all input operands are available and the instructions 104(0)-104(I) are ready for dispatch and execution. A dispatch stage 118 then distributes the instructions 104(0)-104(I) to one of one or more execution units 120 of the OOP 102. As non-limiting examples, the one or more execution units 120 may comprise an arithmetic logic unit (ALU) and/or a floating-point unit. The one or more execution units 120 may provide results of instruction execution to a load/store unit (LSU) 122. Instructions that have completed execution are then sent to a writeback stage 124 of the execution pipeline 112, where the architectural state of the OOP 102 is updated based on the results of execution.

As noted above, the degree of instruction-level parallelism (i.e., the number of the instructions 104(0)-104(I) that can be execution simultaneously) and memory-level parallelism (i.e., the number of pending memory operations being performed simultaneously) achievable by the OOP 102 may depend in large part on a number of physical registers (not shown) available for use by the OOP 102. The number of physical registers in turn may depend on the size of a physical register file (PRF) (not shown) in which the physical registers are stored. A larger PRF enables the OOP 102 to use a larger out-of-order instruction window, thus improving processor performance by increasing processor throughput in terms of instructions executed per processor cycle. However, the use of a larger PRF may also prevent the OOP 102 from employing higher processor clock frequencies, which may negatively impact processor performance. Alternative approaches using either virtual registers or checkpoints may provide an effectively larger number of physical registers, but may result in deadlock scenarios or otherwise prove ineffective.

In this regard, the OOP 102 includes a register management circuit 126 that is configured to provide late register allocation and early register release using a combination of virtual registers and checkpoints constructed according to checkpoint creation criteria. Before describing operations for creating and releasing checkpoints and virtual and physical registers, the constituent elements of the register management circuit 126 of FIG. 1 according to some aspects are first discussed. Thus, FIG. 2 provides an overview of the register management circuit 126, while FIGS. 3-6 illustrate in greater detail the internal structures of the register management circuit 126. FIGS. 7-17 then show various operations performed by the register management circuit 126 for creating and releasing checkpoints, and allocating and releasing virtual and physical registers as disclosed herein.

Referring now to FIG. 2, the register management circuit 126 of the OOP 102 includes register management control logic 200 that controls the operations described herein for checkpoint creation and release as well as for register allocation and release. To facilitate these operations, the register management circuit 126 provides a number of elements that include a most recent table (MRT) 202, a physical register file (PRF) 204, a virtual register file (VRF) 206, and a checkpoint queue 208. The MRT 202 is used by the register management circuit 126 to store the most recent mappings of logical register numbers (LRNs) to virtual register numbers (VRNs) and physical register numbers (PRNs). The PRF 204 stores data related to each physical register provided by the register management circuit 126, while the VRF 206 stores information for each virtual register provided by the register management circuit 126. Finally, the checkpoint queue 208 stores currently pending checkpoints, each of which comprises a snapshot of the MRT 202 at a given point in time. The constituent elements of the MRT 202, the PRF 204, the VRF 206, and the checkpoint queue 208 are discussed in greater detail below with respect to FIGS. 3-6, respectively.

Some aspects of the register management circuit 126 also include elements for providing additional functionality. In some aspects, the register management circuit 126 comprises a VRN obsolete list 210 and a PRN obsolete list 212, as well as a VRN free list 214 and a PRN free list 216, The VRN obsolete list 210 and a PRN obsolete list 212 each comprise first-in-first-out (FIFO) queues that are used by the register management circuit to track "obsolete" VRNs and PRNs, respectively. An "obsolete" VRN or PRN, as referenced herein, refers to a VRN or PRN that has been associated with an LRN that is being reassigned to a different VRN or PRN, and for which the register management circuit 126 has determined that any producer instructions are not going to be flushed from the execution pipeline 112. In these circumstances, the register management circuit 126 can conclude that the current VRN or PRN will not be required in the event of a misprediction or an exception.

Similarly, the VRN free list 214 and the PRN free list 216 are FIFO queues used to track free VRNs and PRNs, respectively. A "free" VRN or PRN, as referenced herein, is one that is obsolete, stores data generated by a producer instruction, and has been accessed by all of its consumer instructions. Some aspects of the register management circuit 126 are configured to periodically walk the VRN obsolete list 210 and the PRN obsolete list 212 to identify any VRNs or PRNs, respectively, that qualify to be freed. Any VRNs or PRNs identified that meet the above-noted criteria for freeing are removed from the VRN obsolete list 210 or the PRN obsolete list 212, respectively, and are added to the VRN free list 214 and the PRN free list 216, respectively.

Figure 3:
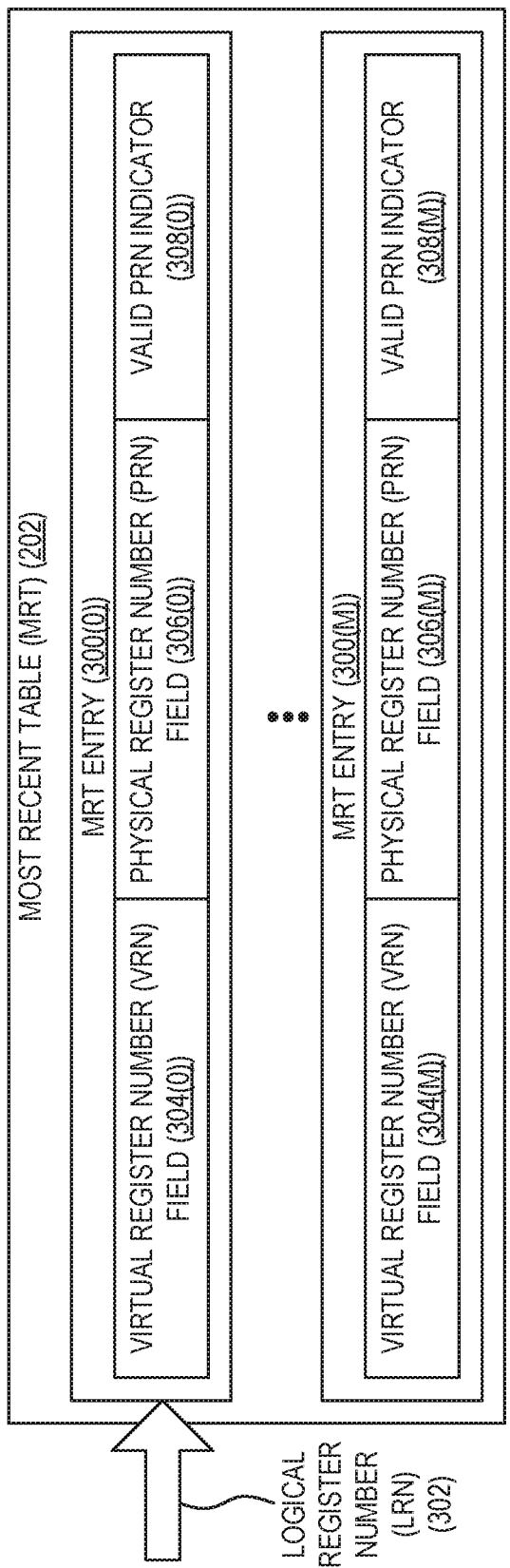
FIG. 3 is a block diagram illustrating exemplary constituent elements of a most recent table (MRT) of the register management circuit of FIGS. 1 and 2.

The register management circuit 126 in some aspects may also provide a variety of thresholds that may be used to fine-tune the checkpoint creation criteria used by the register management circuit 126. For example, the register management circuit 126 may provide a minimum instruction count threshold 218 and a maximum instruction count threshold 220, each of which may be used to determine an appropriate spacing of checkpoints. In particular, the minimum instruction count threshold 218 may indicate a minimum number of instructions that is allowable between checkpoints, while the maximum instruction count threshold 220 may represent a maximum number of instructions allowable between checkpoints. The register management circuit 126 may also maintain a maximum checkpoint count threshold 222 that indicates a maximum number of checkpoints that may be created in the checkpoint queue 208. According to some aspects, the register management circuit 126 may calculate a branch mispredictions per thousand instructions (PKI) rate 224 based on, for example, data provided by the branch predictor 108 of FIG. 1. The register management circuit 126 may then compare the branch mispredictions PKI rate 224 to a minimum branch misprediction threshold 226 and/or a maximum branch misprediction threshold 228 as part of evaluating checkpoint creation criteria. As a non-limiting example, the register management circuit 126 may be configured to create checkpoints more frequently if the branch mispredictions PKI rate 224 exceeds the maximum branch misprediction threshold 228, and/or reduce the frequency of checkpoints if the branch mispredictions PKI rate 224 falls below the minimum branch misprediction threshold 226, FIG. 3 provides a more detailed view of the constituent elements of the MRT 202 of FIG. 2. As seen in FIG. 3, the MRT 202 includes a plurality of MRT entries 300(0)-300(M), each corresponding to an LRN, such as LRN 302, and accessed using the corresponding LRN 302 as an index. The MRT entries 300(0)-300(M) include corresponding VRN fields 304(0)-304(M), PRN fields 306(0)-306(M), and valid PRN indicators 308(0)-308(M). Each of the VRN fields 304(0)-304(M) is used by the register management circuit 126 of FIGS. 1 and 2 to store a VRN mapped to the corresponding LRN, while each of the PRN fields 306(0)-306(M) stores a PRN mapped to the corresponding LRN. The valid PRN indicators 308(0)-308(M) indicate to the register management circuit 126 whether the respective MRT entry 300(0)-300(M) contains a valid PRN in its PRN field 306(0)-306(M).

Figure 4:
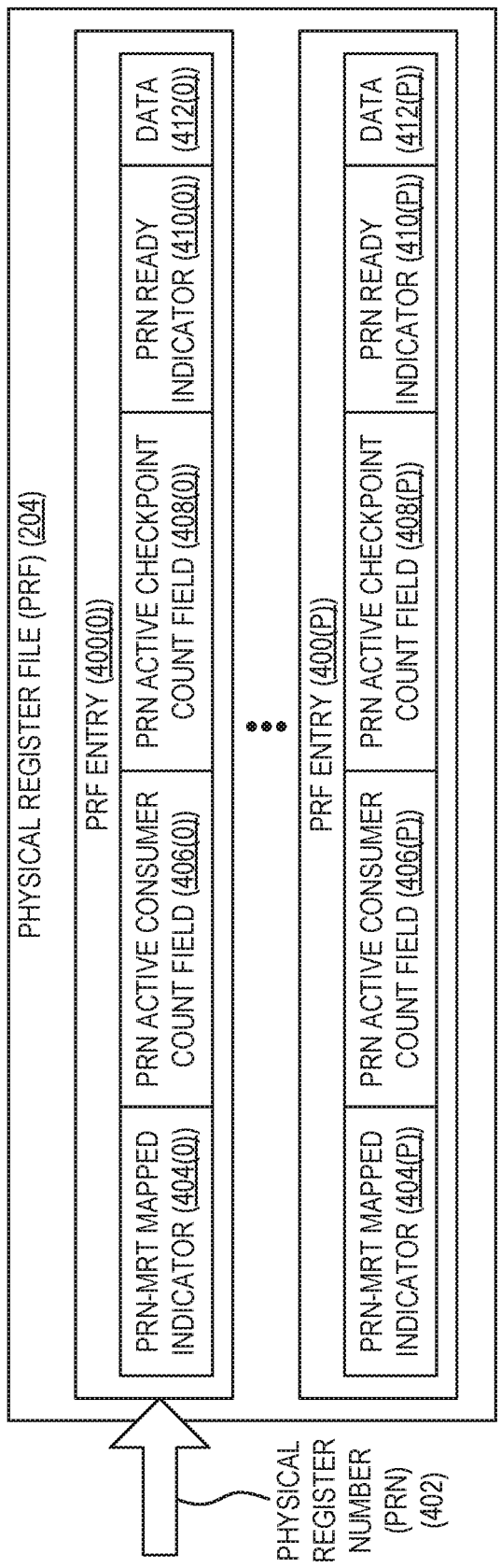
FIG. 4 is a block diagram illustrating exemplary constituent elements of a physical register file (PRF) of the register management circuit of FIGS. 1 and 2.

The internal structure of the PRF 204 is illustrated in greater detail in FIG. 4. As seen in FIG. 4, the PRF 204 comprises a plurality of PRF entries 400(0)-400(P) that are indexed by a PRN such as PRN 402. Each of the PRF entries 400(0)-400(P) includes a corresponding PRN-MRT mapped indicator 404(0)-404(P), which indicates whether the PRN corresponding to the PRF entry 400(0)-400(P) is currently mapped to an LRN and a VRN in the MRT 202. The PRF entries 400(0)-400(P) each also maintain a corresponding PRN active consumer count field 406(0)-400(P) indicating how many active consumer instructions have yet to access the data from the physical register corresponding to the PRN, as well as a PRN active checkpoint count field 408(0)-408(P) that indicates a number of active checkpoints in which the corresponding PRN is currently checkpointed. PRN ready indicators 410(0)-410(P) indicate whether the PRNs corresponding to the PRF entries 400(0)-400(P) currently contain valid data, which may be stored as data 412(0)-412(P) in the PRF entries 400(0)-400(P).

Figure 5:
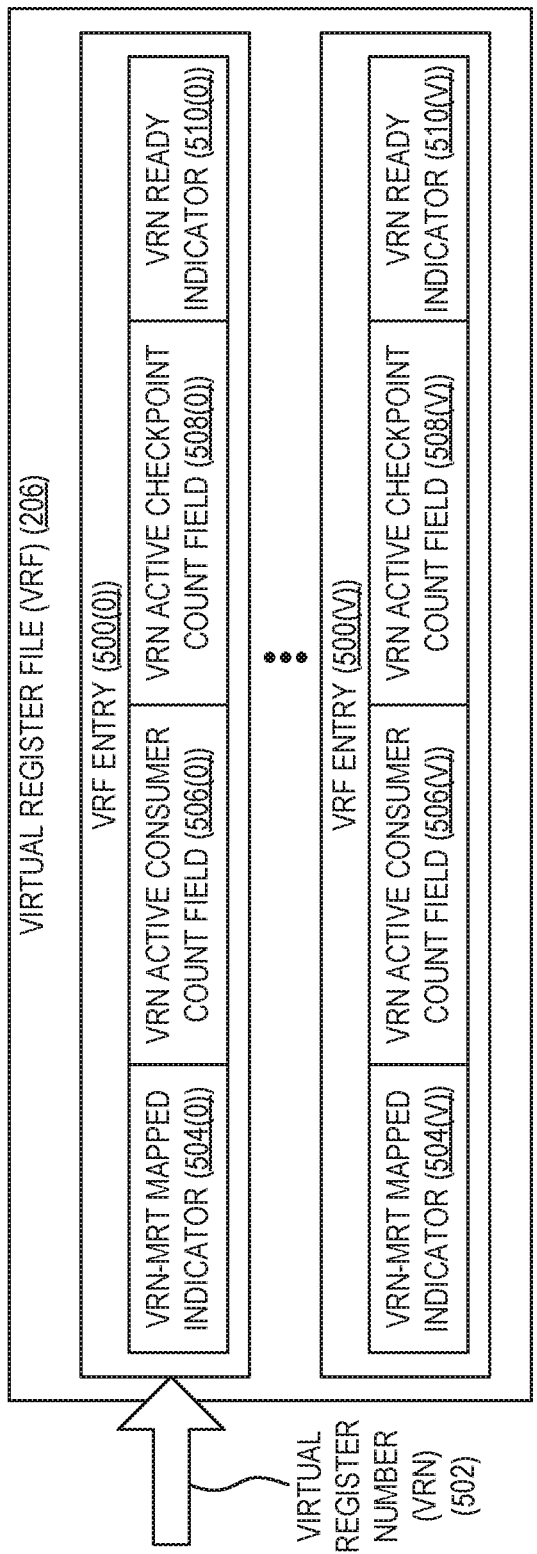
FIG. 5 is a block diagram illustrating exemplary constituent elements of a virtual register file (VRF) of the register management circuit of FIGS. 1 and 2.

The internal structure of the VRF 206 is similar to that of the PRF 204, and is illustrated in greater detail in FIG. 5. In the example of FIG. 5, the VRF 206 includes a plurality of VRF entries 500(0)-500(V), indexed by a VRN such as VRN 502, The VRF entries 500(0)-500(V) provides corresponding VRN-MRT mapped indicators 504(0)-504(V), VRN active consumer count fields 506(0)-506(V), VRN active checkpoint count fields 508(0)-508(V), and VRN ready indicators 510(0)-510(V). The VRN-MRT mapped indicators 504(0)-504(V) indicate whether the VRN corresponding to the VRF entry 500(0)-500(V) is currently mapped to an LRN and a PRN in the MRT 202. Each of the VRN active consumer count fields 506(0)-506(V) indicate how many active consumer instructions have read the corresponding VRN as a source operand (i.e., because the corresponding PRN has not been allocated yet), while each of the VRN active checkpoint count fields 508(0)-508(V) indicate a number of active checkpoints in which the corresponding VRN is currently checkpointed. Finally, the VRN ready indicators 510(0)-510(V) indicate whether the VRNs corresponding to the VRF entries 500(0)-500(V) currently contain valid data.

Figure 6:
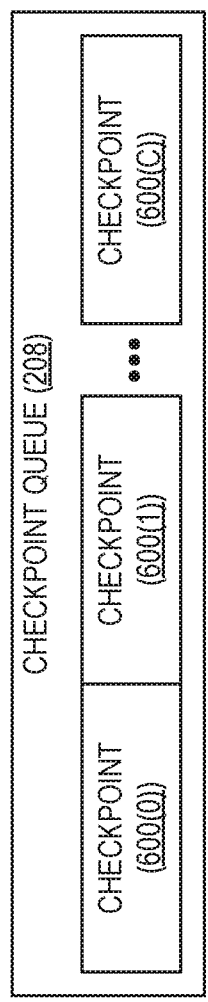
FIG. 6 is a block diagram illustrating exemplary constituent elements of a checkpoint queue of the register management circuit of FIGS. 1 and 2.

The checkpoint queue 208 of FIG. 2 is illustrated in greater detail in FIG. 6. As seen in FIG. 6, the checkpoint queue 208 is implemented as a FIFO queue in which checkpoints 600(0)-600(C) are stored. Each of the checkpoints 600(0)-600(C) comprises a snapshot of the contents of the MRT 202 of FIG. 2 at the time the checkpoint 600(0)-600(C) was created. As discussed in greater detail below with respect to FIG. 7, the checkpoints 600(0)-600(C) are created by the register management circuit 126 in response to a checkpoint creation criteria being satisfied. The checkpoints 600(0)-600(C) are used by the register management circuit 126 to enable early register release, and to facilitate recovery from PRN deadlock scenarios. The register management circuit 126 in some aspects will periodically check the oldest of the checkpoints 600(0)-600(C), and will release the oldest checkpoints 600(0)-600(C) if there exists a next-younger checkpoint 600(0)-600(C) and all instructions between the oldest and next-younger checkpoint 600(0)-600(C) are confirmed to complete without being flushed from the execution pipeline 112.

Figure 7:
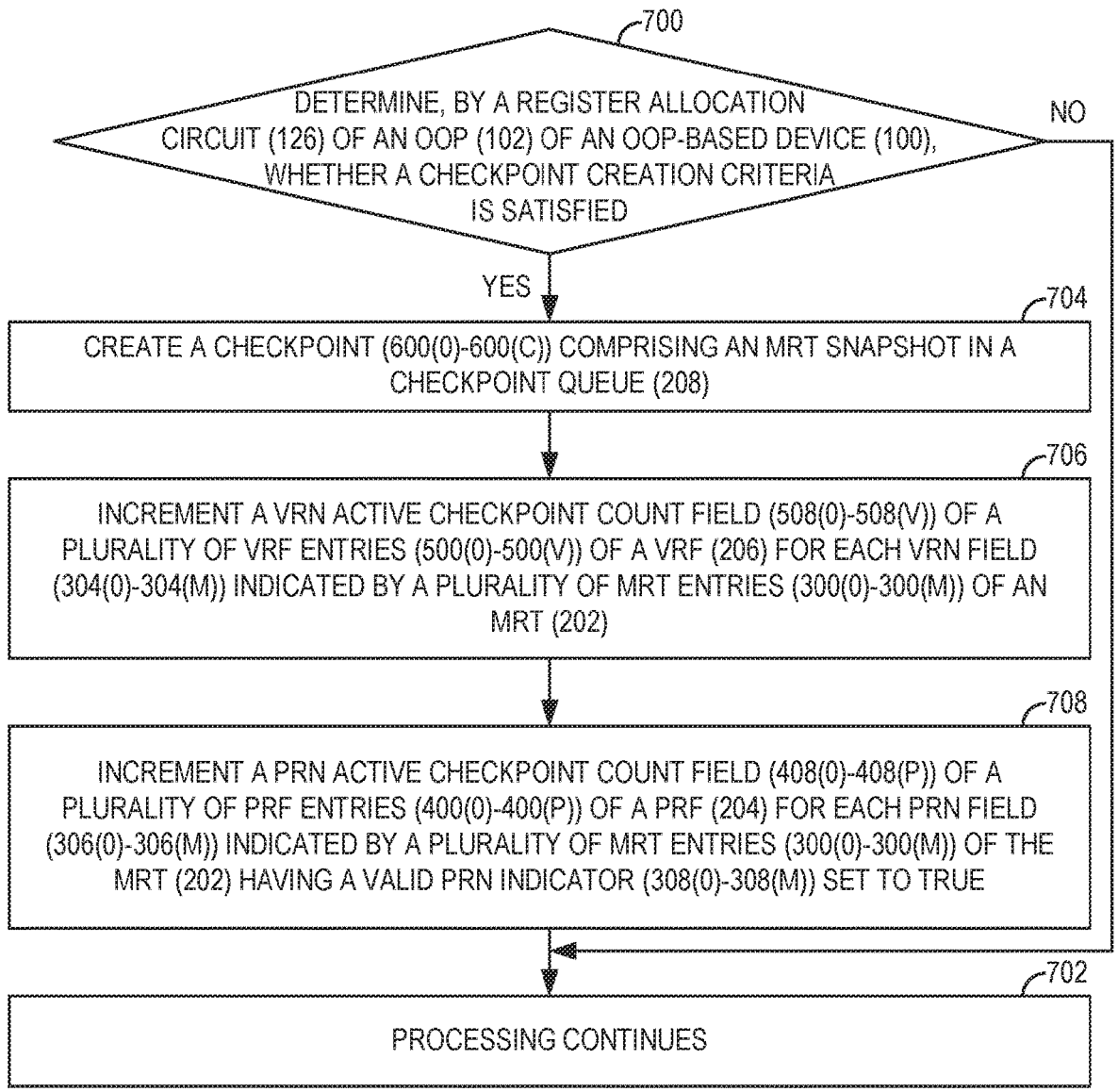
FIG. 7 is a flowchart illustrating exemplary operations of the register management circuit of FIGS. 1 and 2 for construction checkpoints according to checkpoint creation criteria.

To illustrate exemplary operations of the register management circuit 126 of FIGS. 1 and 2 for construction checkpoints according to checkpoint creation criteria, FIG. 7 is provided. For the sake of clarity, elements of FIGS. 1-6 are referenced in describing FIG. 7. Operations according to FIG. 7 begin with the register management circuit 126 determining whether a checkpoint creation criteria is satisfied (block 700). In one aspect, operations of block 700 for determining whether the checkpoint criteria is satisfied may include determining whether, during execution of a low-confidence branch (i.e., a branch in program control that has a relatively high likelihood of having been mispredicted), a number of instructions (such as the instructions 104(0)-104(I)) since a most recent checkpoint (such as the checkpoints 600(0)-600(C)) exceeds a minimum instruction count threshold 218, and a total number of checkpointed PRNs does not exceed a maximum checkpoint count threshold 222. In this manner, the register management circuit 126 can ensure a minimum distance between the checkpoints 600(0)-600(C), as well as guarantee that there is always a number of un-checkpointed PRNs that are available for making forward progress. As discussed below with respect to FIG. 8, some aspects of the register management circuit 126 may be configured to dynamically modify the minimum instruction count threshold 218 based on changes in the branch mispredictions PKI rate 224. Aspects of the register management circuit 126 may determine that a low-confidence branch is executing based on a branch predictor counter provided by the branch predictor 108 of FIG. 1, and/or by using a dedicated branch confidence estimator provided by the branch predictor 108 or provided as a standalone element of the OOP 102 of FIG. 1.

Some aspects of the register management circuit 126 may provide that operations of block 700 for determining whether the checkpoint criteria is satisfied comprise determining whether a conditional branch instruction 104(0)-104(I) is detected within a maximum instruction count threshold 220 since a most recent checkpoint 600(0)-600(C). By doing so, the register management circuit 126 may reduce a number of re-executed instructions in cases of misprediction or exceptions by enforcing a maximum distance between the checkpoints 600(0)-600(C). According to some aspects of the register management circuit 126, operations of block 700 for determining whether the checkpoint criteria is satisfied may include may include determining, during re-execution from a previous checkpoint 600(0)-600(C) resulting from a mispredicted branch instruction 104(0)-104(1), whether a conditional branch instruction 104(0)-104(I) is detected following the mispredicted branch instruction 104(0)-104(I). This checkpoint creation criteria allows the register management circuit 126 to prevent multiple re-execution of the same instruction 104(0)-104(I). It is to be understood that the checkpoint creation criteria noted above are not intended to be exhaustive, and other checkpoint creation criteria may be applied in addition to or in place of the above-noted checkpoint creation criteria.

With continued reference to FIG. 7, if the register management circuit 126 determines at decision block 700 that the checkpoint creation criteria has not been satisfied, processing resumes at block 702. However, if it is determined at decision block 700 that the checkpoint creation criteria is satisfied, the register management circuit 126 creates a checkpoint 600(0)-600(C) comprising an MRT snapshot in the checkpoint queue 208 (block 704). The MRT snapshot represents a copy of the contents of the MRT 202 at the point in time that the checkpoint 600(0)-600(C) is created. The register management circuit 126 next increments the VRN active checkpoint count field 508(0)-508(V) of the plurality of VRF entries 500(0)-500(V) of the VRF 206 for each VRN field 304(0)-304(M) indicated by the plurality of MRT entries 300(0)-300(M) of the MRT 202 (block 706). The register management circuit 126 also increments the PRN active checkpoint count field 408(0)-408(P) of the plurality of PRE entries 400(0)-400(P) of the PRF 204 for each PRN field 306(0)-306(M) indicated by the plurality of MRT entries 300(0)-300(M) of the MRT 202 having a valid PRN indicator 308(0)-308(M) set to true (block 708), Processing of instructions then continues (block 702).

Figure 8:
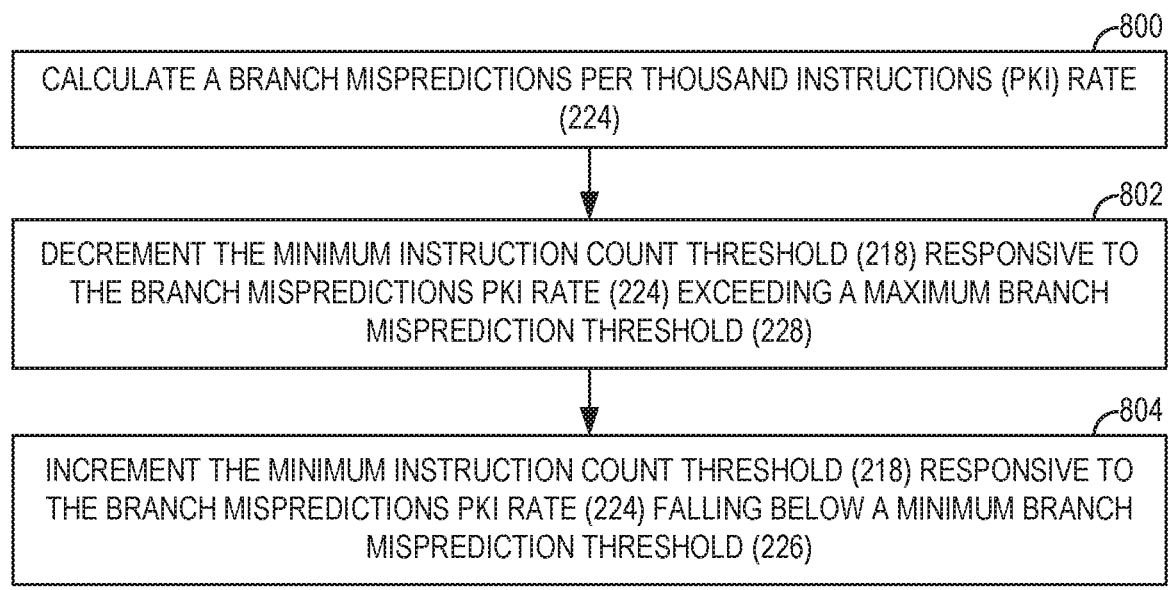
FIG. 8 is a flowchart illustrating exemplary operations of the register management circuit of FIGS. 1 and 2 for dynamically modifying the minimum instruction count threshold used for evaluating checkpoint criteria.

As noted above, the minimum instruction count threshold 218, which is used by some aspects of the register management circuit 126 to determine whether to create the checkpoints 600(0)-600(C), may be dynamically modified by the register management circuit 126. In this regard, FIG. 8 is provided to illustrate exemplary operations of such aspects of the register management circuit 126 of FIGS. 1 and 2 for dynamically modifying the minimum instruction count threshold 218 used for evaluating checkpoint criteria. Elements of FIGS. 1, 2, and 6 are referenced in describing FIG. 8 for the sake of clarity.

Operations according to FIG. 8 begin with the register management circuit 126 calculating the branch mispredictions PKI rate 224 (block 800). In some aspects, calculating the branch mispredictions PKI rate 224 may be based on data received from the branch predictor 108 of FIG. 1. The register management circuit 126 decrements the minimum instruction count threshold 218 responsive to the branch mispredictions PKI rate 224 exceeding a maximum branch misprediction threshold 228 (block 802). In this manner, the register management circuit 126 may create checkpoints 600(0)-600(C) that are closer together if the branch mispredictions PKI rate 224 is higher than the maximum branch misprediction threshold 228. Conversely, the register management circuit 126 increments the minimum instruction count threshold 218 responsive to the branch mispredictions PKI rate 224 falling below a minimum branch misprediction threshold 226. This allows the register management circuit 126 to space the checkpoints 600(0)-600(C) farther apart, limiting the number of the checkpoints 600(0)-600(C) and the number of checkpointed. PRNs.

Figure 9:
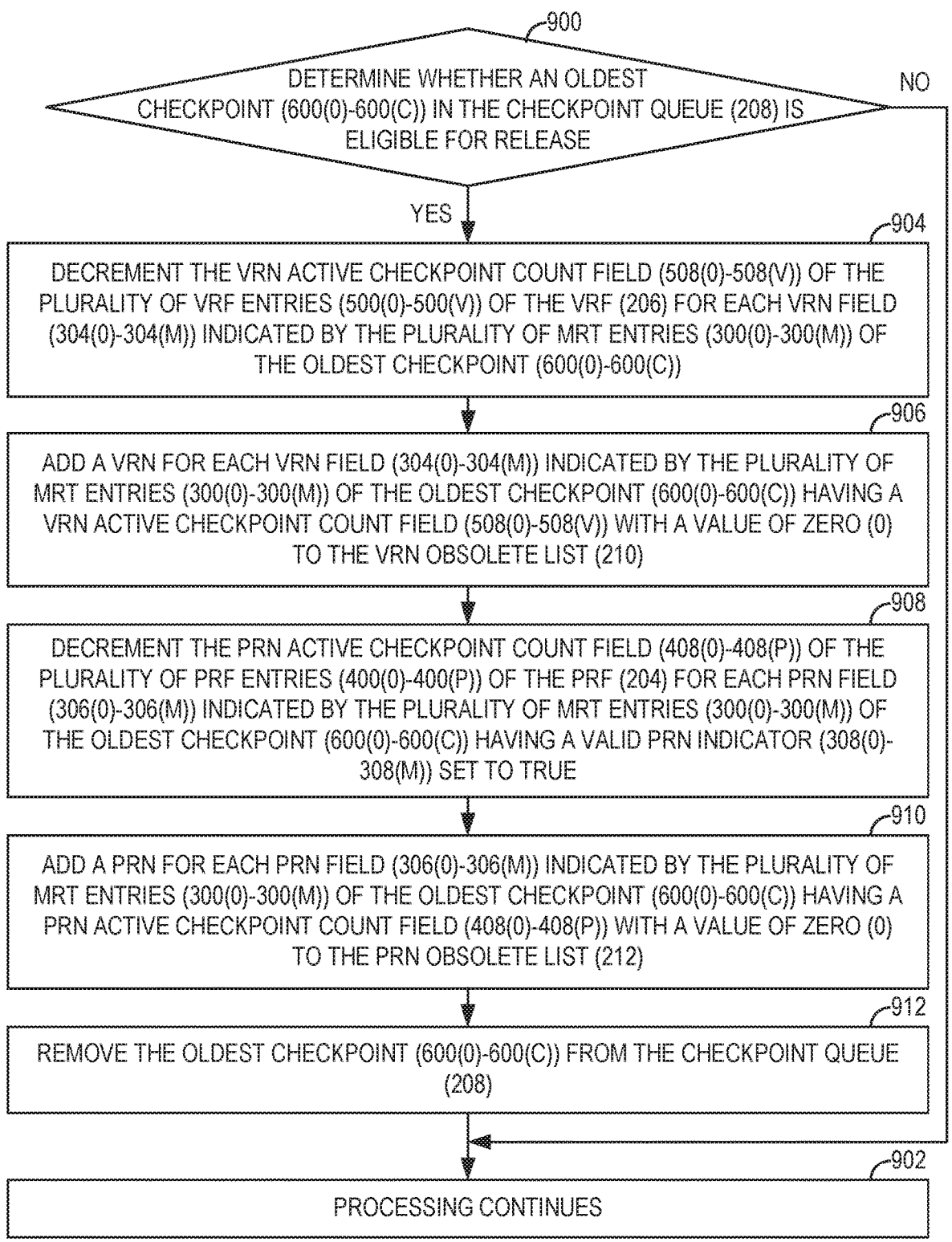
FIG. 9 is a flowchart illustrating exemplary operations of the register management circuit of FIGS. 1 and 2 for releasing checkpoints.

To illustrate exemplary operations of the register management circuit 126 of FIGS. 1 and 2 for releasing the checkpoints 600(0)-600(C), FIG. 9 is provided. For the sake of clarity, elements of FIGS. 1-6 are referenced in describing FIG. 9. In FIG. 9, operations begin with the register management circuit 126 determining whether an oldest checkpoint 600(0)-600(C) in the checkpoint queue 208 is eligible for release (block 900). In some aspects, operations of block 900 for determining whether the oldest checkpoint 600(0)-600(C) in the checkpoint queue 208 is eligible for release may comprise first determining whether a next-younger checkpoint 600(0)-600(C) exists within the checkpoint queue 208. If so, the register management circuit 126 in such aspects may next determine whether all instructions 104(0)-104(I) between the next-younger checkpoint 600(0)-600(C) and the oldest checkpoint 600(0)-600(C) are confirmed not to flush.

If the register management circuit 126 determines at decision block 900 that the oldest checkpoint 600(0)-600(C) in the checkpoint queue 208 is not eligible for release, processing resumes at block 902. However, if it is determined at decision block 900 that the oldest checkpoint 600(0)-600(C) in the checkpoint queue 208 is eligible for release, the register management circuit 126 decrements the VRN active checkpoint count field 508(0)-508(V) of the plurality of VRF entries 500(0)-500(V) of the VRF 206 for each VRN field 304(0)-304(M) indicated by the plurality of MRT entries 300(0)-300(M) of the oldest checkpoint 600(0)-600(C) (block 904). The register management circuit 126 next adds a VRN for each VRN field 304(0)-304(M) indicated by the plurality of MRT entries 300(0)-300(M) of the oldest checkpoint 600(0)-600(C) having a VRN active checkpoint count field 508(0)-508(V) with a value of zero (0) to the VRN obsolete list 210 (block 906). The register management circuit 126 then decrements the PRN active checkpoint count field 408(0)-408(P) of the plurality of PRF entries 400(0)-400(P) of the PRF 204 for each PRN field 306(0)-306(M) indicated by the plurality of MKT entries 300(0)-300(M) of the oldest checkpoint 600(0)-600(C) having a valid PRN indicator 308(0)-308(M) set to true (block 908). The register management circuit 126 adds a PRN for each PRN field 306(0)-306(M) indicated by the plurality of MRT entries 300(0)-300(M) of the oldest checkpoint 600(0)-600(C) having a PRN active checkpoint count field 408(0)-408(P) with a value of zero (0) to the PRN obsolete list 212 (block 910). Finally, the register management circuit 126 removes the oldest checkpoint 600(0)-600(C) from the checkpoint queue 208 (block 912). Processing then continues (block 902).

Figure 10:
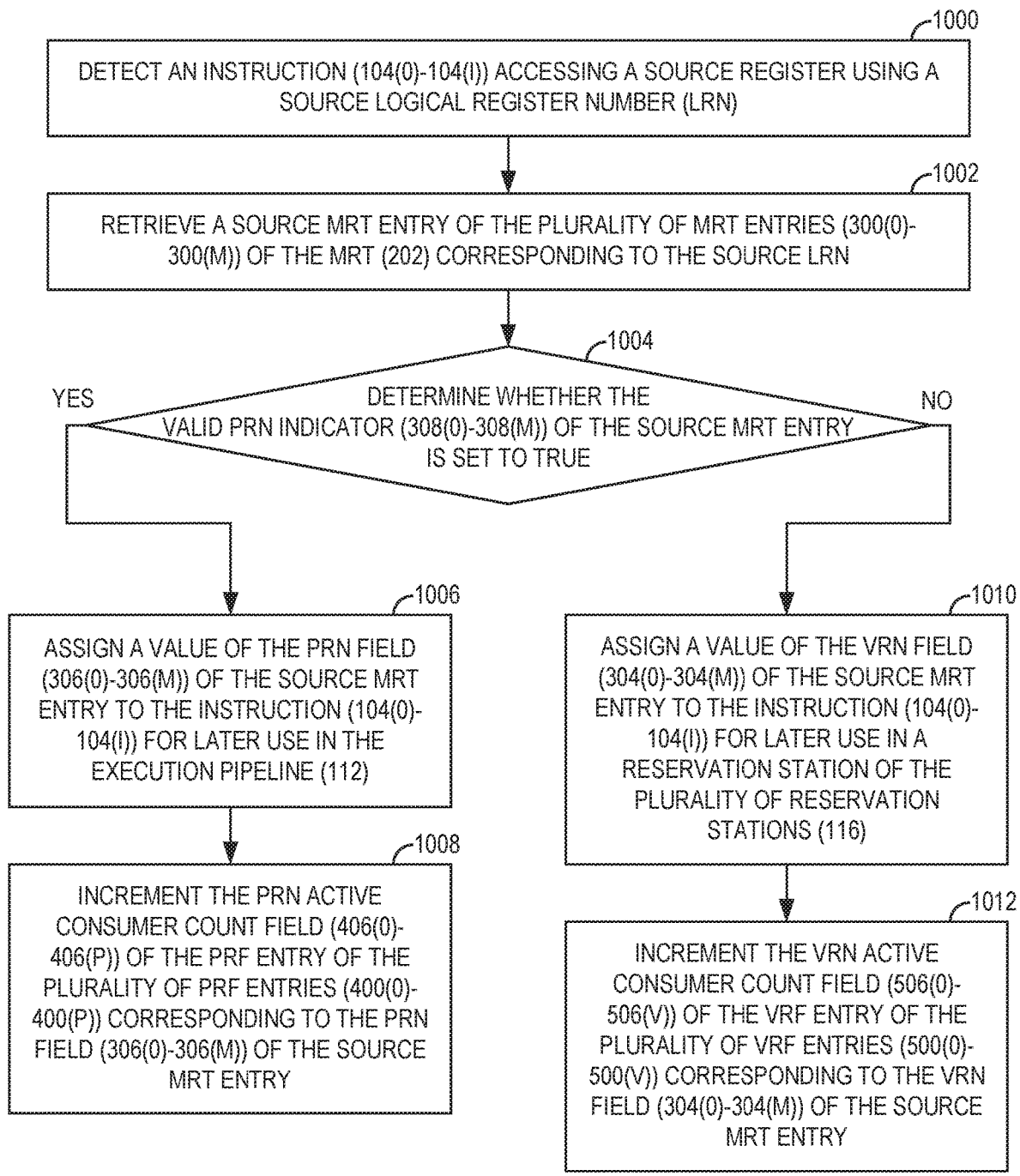
FIG. 10 is a flowchart illustrating exemplary operations of the register management circuit of FIGS. 1 and 2 for performing source renaming of virtual registers.

FIG. 10 illustrates exemplary operations of the register management circuit 126 of FIGS. 1 and 2 for performing source renaming of virtual registers. Elements of FIGS. 1, 3, 4, and 5 are referenced in describing FIG. 10 for the sake of clarity. In FIG. 10, operations begin with the register management circuit 126 first detecting an instruction, such as one of the instructions 104(0)-104(I), accessing a source register using a source LRN (block 1000). The register management circuit 126 retrieves a source MRT entry of the plurality of MRT entries 300(0)-300(M) of the MRT 202 corresponding to the source LRN (block 1002). The register management circuit 126 then determines whether the valid PRN indicator 308(0)-308(M) of the source MRT entry is set to true (block 1004). If so (i.e., a PRN has been allocated for the source LRN), the register management circuit 126 assigns a value of the PRN field 306(0)-306(M) of the source MRT entry to the instruction 104(0)-104(I) for later use in the execution pipeline 112 (block 1006). The register management circuit 126 then increments the PRN active consumer count field 406(0)-406(P) of the PRF entry of the plurality of PRF entries 400(0)-400(P) corresponding to the PRN field 306(0)-306(M) of the source MRT entry (block 1008).

However, if the register management circuit 126 determines at decision block 1004 of FIG. 10 that the valid PRN indicator 308(0)-308(M) of the source MRT entry is set to false (indicating that a PRN has not been allocated for the source LRN), the register management circuit 126 assigns a value of the VRN field 304(0)-304(M) of the source MRT entry to the instruction 104(0)-104(I) for later use in a reservation station of the plurality of reservation stations 116 (block 1010), The register management circuit 126 then increments the VRN active consumer count field 506(0)-506(V) of the VRF entry of the plurality of VRF entries 500(0)-500(V) corresponding to the VRN field 304(0)-304(M) of the source MRT entry (block 1012).

Figure 11A:
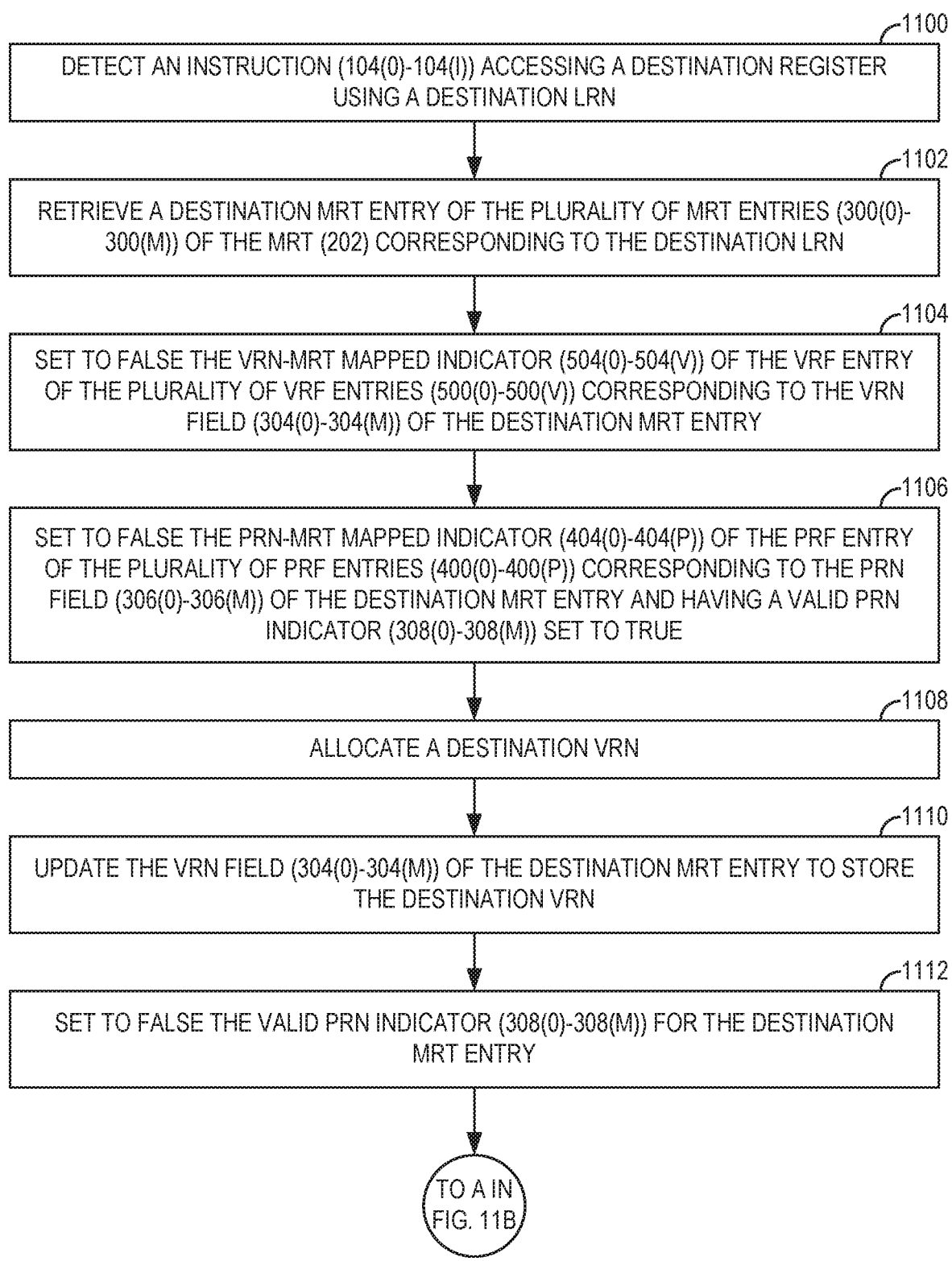
FIGS. 11A-11C are flowcharts illustrating exemplary operations of the register management circuit of FIGS. 1 and 2 for performing destination renaming for virtual registers.
Figure 11B:
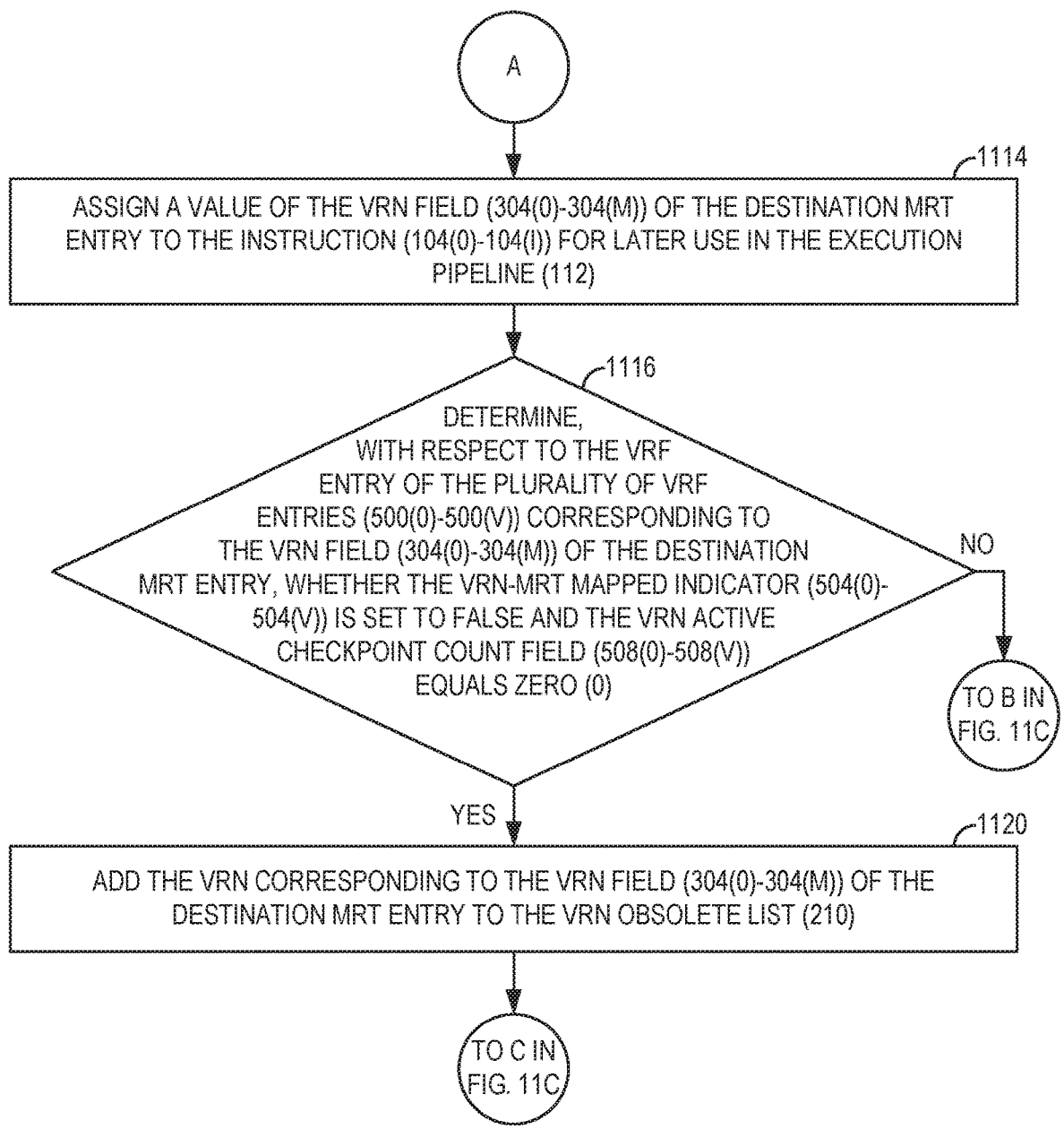
Figure 11C:
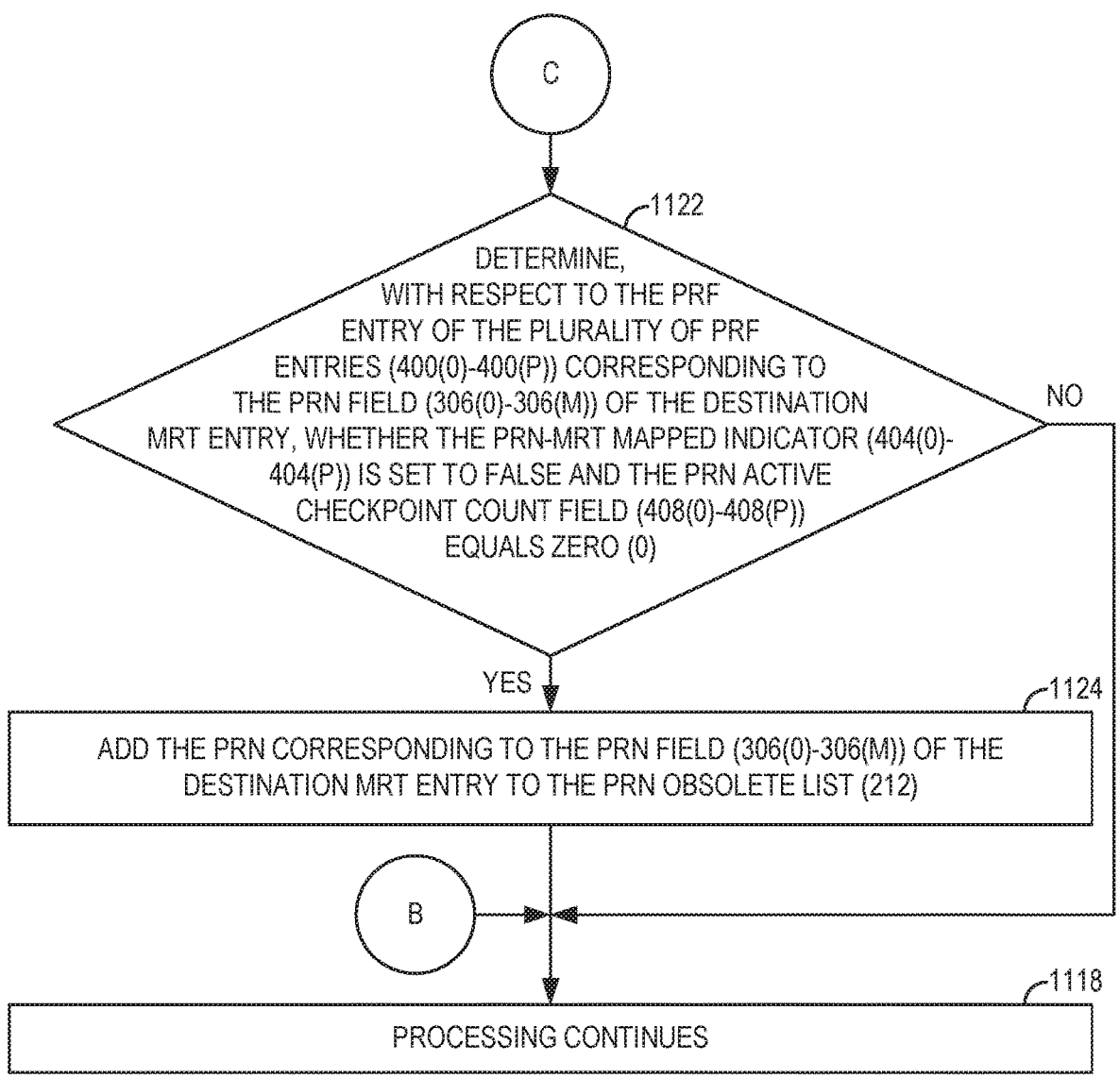

FIGS. 11A-11C are flowcharts illustrating exemplary operations of the register management circuit 126 of FIGS. 1 and 2 for performing destination renaming for virtual registers. For the sake of clarity, elements of FIGS. 1-5 are referenced in describing FIGS. 11A-11C, Operations according to FIGS. 11A-11C begin with the register management circuit 126 detecting an instruction, such as one of the instructions 104(0)-104(I), accessing a destination register using a destination LRN (block 1100). In response, the register management circuit 126 retrieves a destination MRT entry of the plurality of MRT entries 300(0)-300(M) of the MRT 202 corresponding to the destination LRN (block 1102). The register management circuit 126 next sets to false the VRN-MRT mapped indicator 504(0)-504(V) of the VRF entry of the plurality of VRF entries 500(0)-500(V) corresponding to the VRN field 304(0)-304(M) of the destination MRT entry (block 1104). The register management circuit 126 also sets to false the PRN-MRT mapped indicator 404(0)-404(P) of the PRF entry of the plurality of PRF entries 400(0)-400(P) corresponding to the PRN field 306(0)-306(M) of the destination MRT entry and having a valid PRN indicator 308(0)-308(M) set to true (block 1106).

The register management circuit 126 next allocates a destination VRN (block 1108). After allocating the destination VRN, the register management circuit 126 updates the VRN field 304(0)-304(M) of the destination MRT entry to store the destination VRN (block 1110). The register management circuit 126 also sets to false the valid PRN indicator 308(0)-308(M) for the destination MRT entry (block 1112). Processing then resumes at block 1114 of FIG. 11B.

Referring now to FIG. 11B, the register management circuit 126 assigns a value of the VRN field 304(0)-304(M) of the destination MRT entry to the instruction 104(0)-104(I) for later use in the execution pipeline 112 (block 1114). The register management circuit 126 then determines, with respect to the VRF entry of the plurality of VRF entries 500(0)-500(V) corresponding to the VRN field 304(0)-304(M) of the destination MRT entry, whether the VRN-MRT mapped indicator 504(0)-504(V) is set to false and the VRN active checkpoint count field 508(0)-508(V) equals zero (0) (block 1116). If either of these conditions is not met, processing resumes at block 1118 of FIG. 11C. However, if the register management circuit 126 determines at decision block 1116 that the VRN-MRT mapped indicator 504(0)-504(V) is set to false and the VRN active checkpoint count field 508(0)-508(V) equals zero (0), the register management circuit 126 adds the VRN corresponding to the VRN field 304(0)-304(M) of the destination MRT entry to the VRN obsolete list 210 (block 1120). Processing then resumes at block 1122 of FIG. 11C.

Turning now to FIG. 11C, the register management circuit 126 next determines, with respect to the PRF entry of the plurality of PRF entries 400(0)-400(P) corresponding to the PRN field 306(0)-306(M) of the destination MRT entry, whether the PRN-MRT mapped indicator 404(0)-404(P) is set to false and the PRN active checkpoint count field 408(0)-408(P) equals zero (0) (block 1122). If not, processing resumes at block 1118 of FIG. 11C. If it is determined at decision block 1122 that the PRN-MRT mapped indicator 404(0)-404(P) is set to false and the PRN active checkpoint count field 408(0)-408(P) equals zero (0), the register management circuit 126 adds the PRN corresponding to the PRN field 306(0)-306(M) of the destination MRT entry to the PRN obsolete list 212 (block 1124). Processing then continues (block 1118).

Figure 12A:
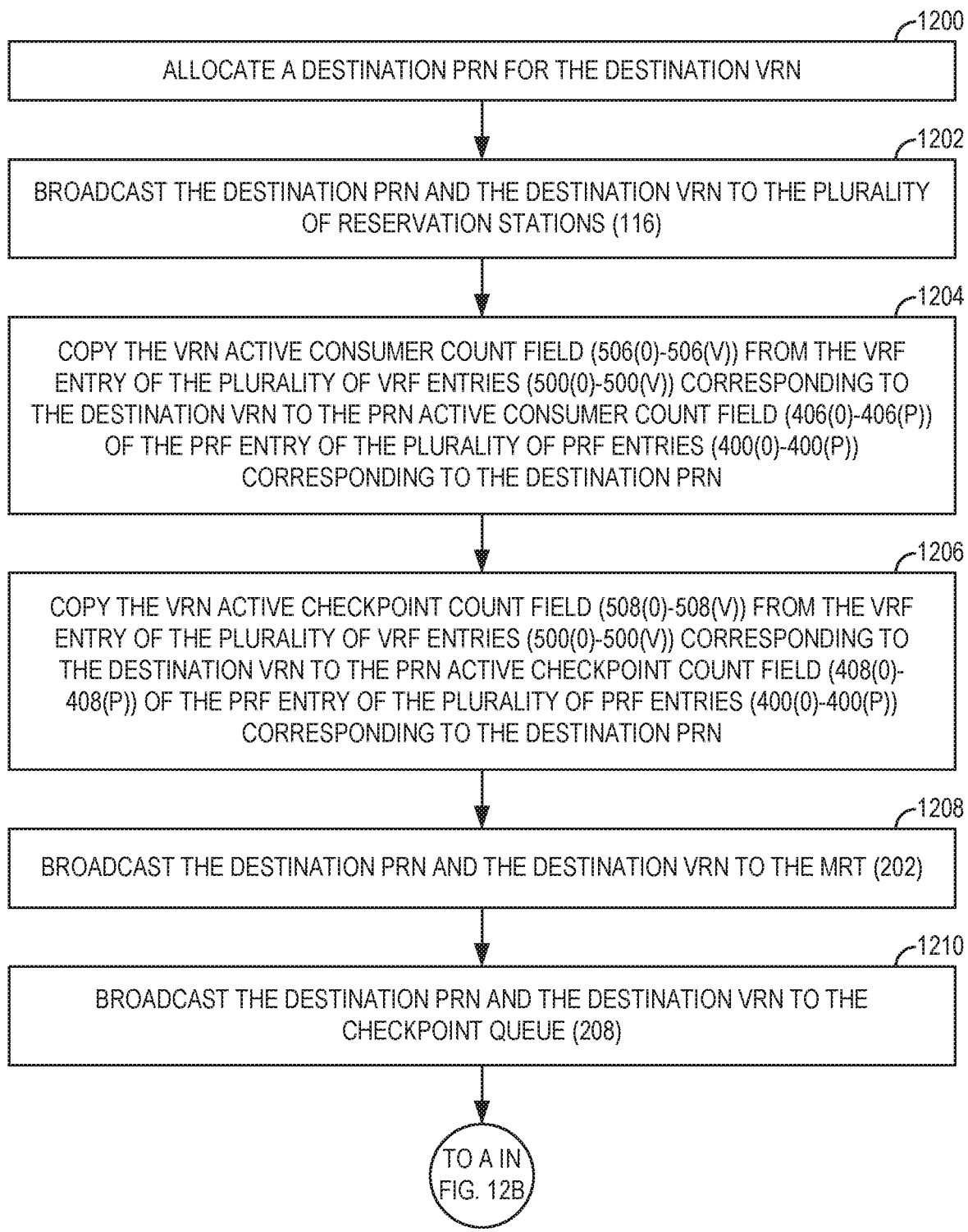
FIGS. 12A-12B are flowcharts illustrating exemplary operations of the register management circuit of FIGS. 1 and 2 for releasing and freeing virtual and physical registers.
Figure 12B:
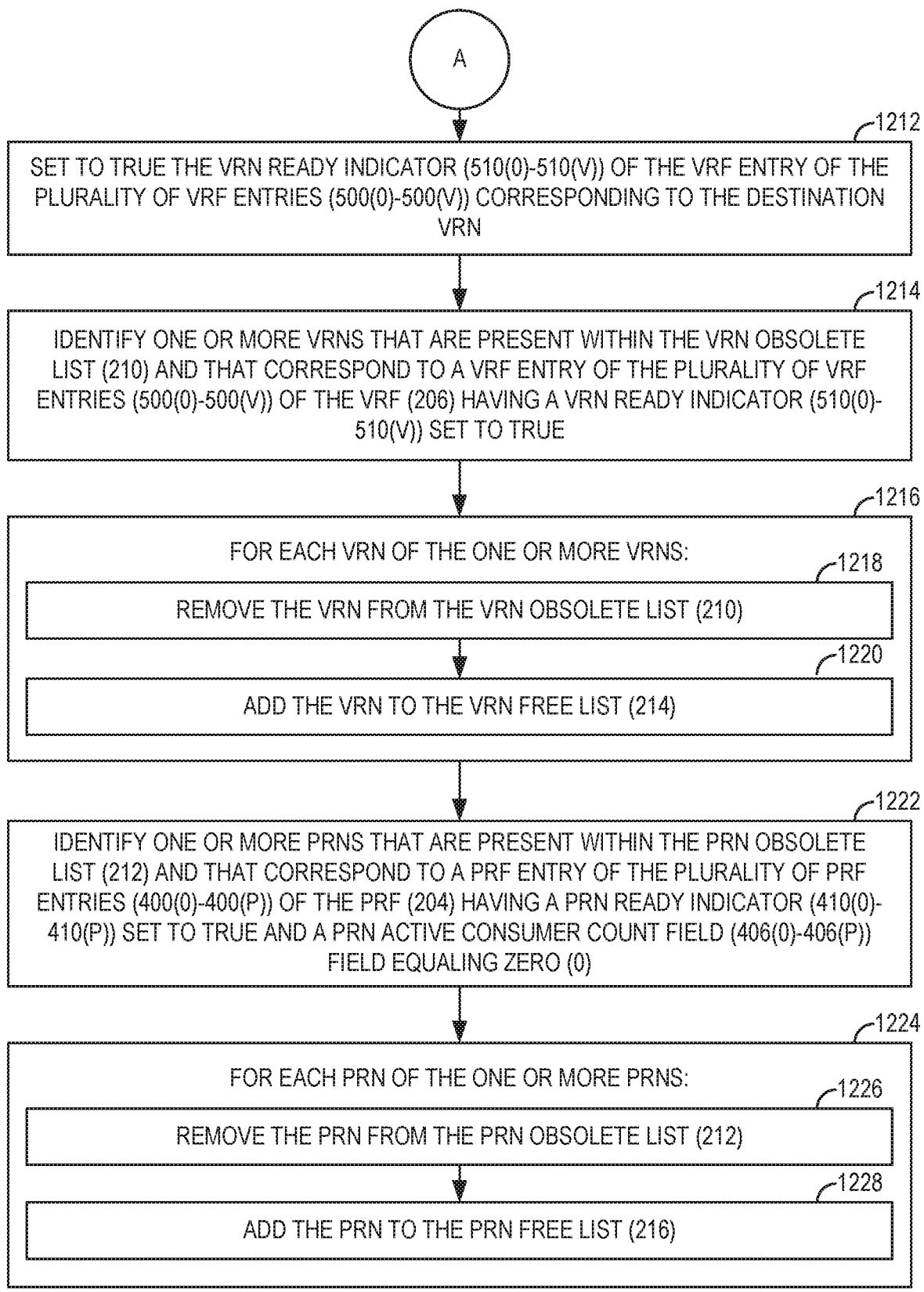

To illustrate exemplary operations of the register management circuit 126 of FIGS. 1 and 2 for releasing and freeing virtual and physical registers, FIGS. 12A-12B are provided. Elements of FIGS. 1, 2, 4, and 5 are referenced in describing FIGS. 12A-12B for the sake of clarity. Operations according to FIGS. 12A-12B begin with the register management circuit 126 allocating a destination PRN for the destination VRN (block 1200), In some aspects, the register management circuit 126 may allocate the destination PRN while dispatching the corresponding instruction, such as one of instructions 104(0)-104(I), within the execution pipeline 112, or may allocate the destination PRN when the instruction 104(0)-104(I) has finished execution and is ready for writeback. The register management circuit 126 next broadcasts the destination PRN and the destination VRN to the plurality of reservation stations 116 (block 1202). The register management circuit 126 copies the VRN active consumer count field 506(0)-506(V) from the VRF entry of the plurality of VRF entries 500(0)-500(V) corresponding to the destination VRN to the PRN active consumer count field 406(0)-406(P) of the PRF entry of the plurality of PRF entries 400(0)-400(P) corresponding to the destination PRN (block 1204). The register management circuit 126 copies the VRN active checkpoint count field 508(0)-508(V) from the VRF entry of the plurality of VRF entries 500(0)-500(V) corresponding to the destination VRN to the PRN active checkpoint count field 408(0)-408(P) of the PRF entry of the plurality of PRF entries 400(0)-400(P) corresponding to the destination PRN (block 1206).

The register management circuit 126 broadcasts the destination PRN and the destination VRN to the MRT 202 (block 1208). Operations of block 1208 for broadcasting the destination PRN and the destination VRN to the MRT 202 according to some aspects are discussed below in greater detail with respect to FIG. 13. Similarly, the register management circuit 126 broadcasts the destination PRN and the destination VRN to the checkpoint queue 208 (block 1210). Operations of block 1210 for broadcasting the destination PRN and the destination VRN to the checkpoint queue 208 in some aspects are discussed below in greater detail with respect to FIG. 14. Processing then resumes at block 1212 of FIG. 12B.

Referring now to FIG. 12B, the register management circuit 126 sets to true the VRN ready indicator 510(0)-510

(V) of the VRF entry of the plurality of VRF entries 500(0)-500(V) corresponding to the destination VRN (block 1212). The register management circuit 126 then identifies one or more VRNs that are present within the VRN obsolete list 210 and that correspond to a VRF entry of the plurality of VRF entries 500(0)-500(V) of the VRF 206 having a VRN ready indicator 510(0)-510(V) set to true (block 1214). The register management circuit 126 then performs operations for each VRN of the one or more VRNs, as indicated by block 1216. In particular, the register management circuit 126 removes the VRN from the VRN obsolete list 210 (block 1218). The register management circuit 126 also adds the VRN to the VRN free list 214 (block 1220).

The register management circuit 126 identifies one or more PRNs that are present within the PRN obsolete list 212 and that correspond to a PRF entry of the plurality of PRF entries 400(0)-400(P) of the PRF 204 having a PRN ready indicator 410(0)-410(P) set to true and a PRN active consumer count field 406(0)-406(P) field equaling zero (0) (block 1222). As shown in block 1224, the register management circuit 126 then performs operations for each PRN of the one or more PRNs particular, the register management circuit 126 removes the PRN from the PRN obsolete list 212 (block 1226). The register management circuit 126 also adds the PRN to the PRN free list 216 (block 1228).

Figure 13:
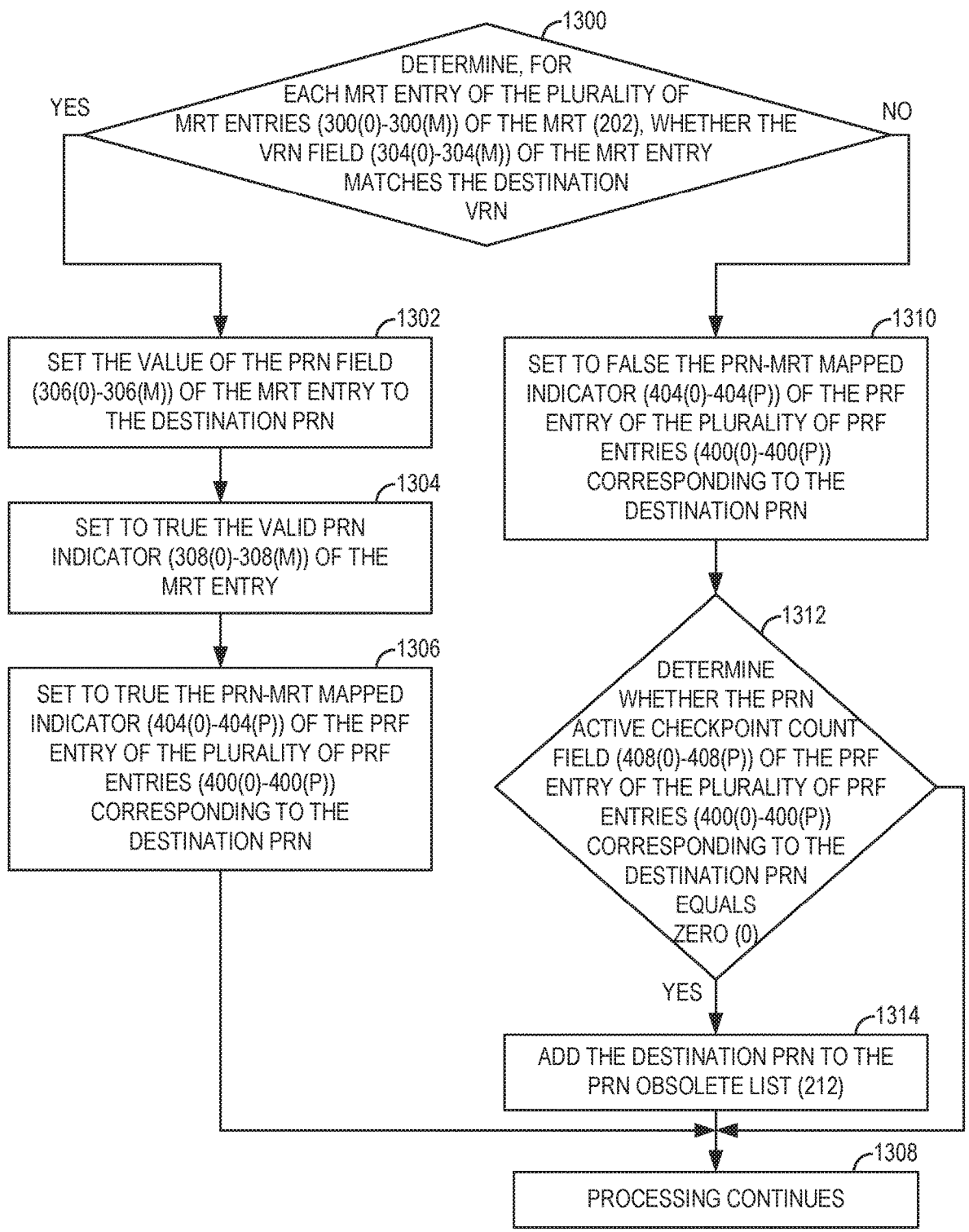
FIG. 13 is a flowchart illustrating exemplary operations of the register management circuit of FIGS. 1 and 2 for broadcasting a destination physical register number (PRN) and a destination virtual register number (VRN) to the MRT of FIGS. 2 and 3.

FIG. 13 illustrates in greater detail exemplary operations of block 1208 of FIG. 12A for broadcasting the destination PRN and the destination VRN to the MRT 202 according to some aspects of the register management circuit 126. For the sake of clarity, elements of FIGS. 1-4 are referenced in describing FIG. 13. In FIG. 13, operations begin with the register management circuit 126 determining, for each MRT entry of the plurality of MRT entries 300(0)-300(M) of the MRT 202, whether the VRN field 304(0)-304(M) of the MRT entry matches the destination VRN (block 1300). If so, the register management circuit 126 sets the value of the PRN field 306(0)-306(M) of the MRT entry to the destination PRN (block 1302). The register management circuit 126 also sets to true the valid PRN indicator 308(0)-308(M) of the MRT entry (block 1304). The register management circuit 126 further sets to true the PRN-MRT mapped indicator 404(0)-404(P) of the PRF entry of the plurality of PRF entries 400(0)-400(P) corresponding to the destination PRN (block 1306). Processing then continues at block 1308.

However, if the register management circuit 126 determines at decision block 1300 that the VRN field 304(0)-304(M) of the MRT entry does not match the destination VRN, the register management circuit 126 sets to false the PRN-MRT mapped indicator 404(0)-404(P) of the PRF entry of the plurality of PRF entries 400(0)-400(P) corresponding to the destination PRN (block 1310). The register management circuit 126 also determines whether the PRN active checkpoint count field 408(0)-408(P) of the PRI entry of the plurality of PRF entries 400(0)-400(P) corresponding to the destination PRN equals zero (0) (block 1312). If not, processing resumes at block 1308. However, if it is determined at decision block 1312 that the PRN active checkpoint count field 408(0)-408(P) of the PRF entry corresponding to the destination PRN equals zero (0), the register management circuit 126 adds the destination PRN to the PRN obsolete list 212 (block 1314). Processing then continues at block 1308.

Figure 14:
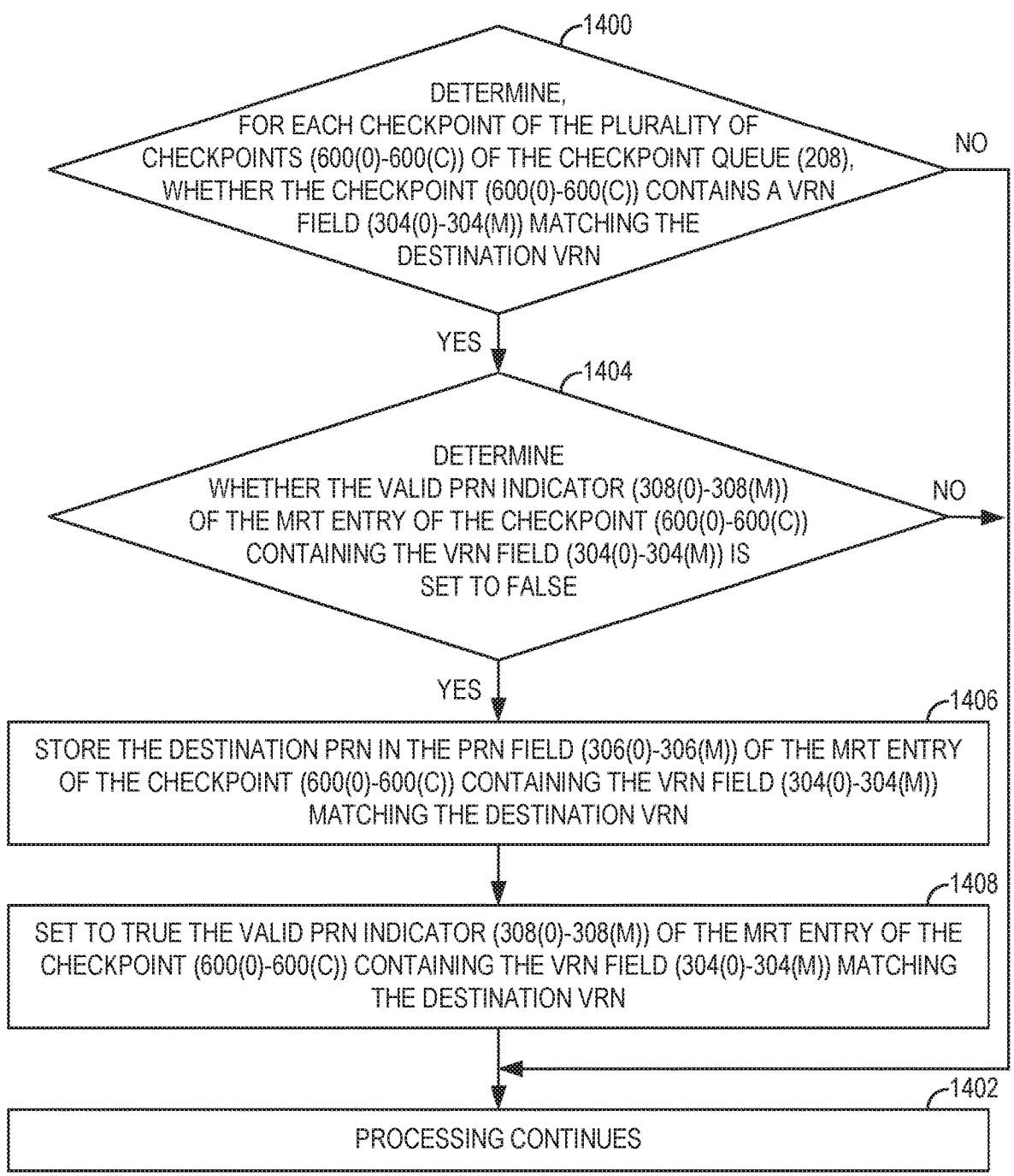
FIG. 14 is a flowchart illustrating exemplary operations of the register management circuit of FIGS. 1 and 2 for broadcasting a destination PRN and a destination VRN to the checkpoint queue of FIGS. 2 and 6.

To illustrate in greater detail operations of block 1210 of FIG. 12A for broadcasting a destination PRN and a destination VRN to the checkpoint queue 208 of FIGS. 2 and 6, FIG. 14 is provided. Elements of FIGS. 1-3 and 6 are referenced in describing FIG. 14 for the sake of clarity. In FIG. 14, operations begin with the register management circuit 126 determining, for each checkpoint of the plurality of checkpoints 600(0)-600(C) of the checkpoint queue 208, whether the checkpoint 600(0)-600(C) contains a VRN field 304(0)-304(M) matching the destination VRN (block 1400). If not, processing resumes at block 1402. However, if the register management circuit 126 determines at decision block 1400 that the checkpoint 600(0)-600(C) does contain a VRN field 304(0)-304(M) matching the destination VRN, the register management circuit 126 next determines whether the valid PRN indicator 308(0)-308(M) of the MRT entry of the checkpoint 600(0)-600(C) containing the VRN field 304(0)-304(M) is set to false (block 1404). If the valid PRN indicator 308(0)-308(M) of the MRT entry of the checkpoint 600(0)-600(C) containing the VRN field. 304 (0)-304(M) is not set to false (i.e., the valid PRN indicator 308(0)-308(M) has a value of true), processing resumes at block 1402. If it is determined at decision block 1404 that the valid PRN indicator 308(0)-308(M) is set to false, the register management circuit 126 stores the destination PRN in the PRN field 306(0)-306(M) of the MRT entry of the checkpoint 600(0)-600(C) containing the VRN field 304(0)-304(M) matching the destination VRN (block 1406). The register management circuit 126 also sets to true the valid PRN indicator 308(0)-308(M) of the MRT entry of the checkpoint 600(0)-600(C) containing the VRN field 304(0)-304(M) matching the destination VRN (block 1408). Processing then continues (block 1402).

Figure 15:
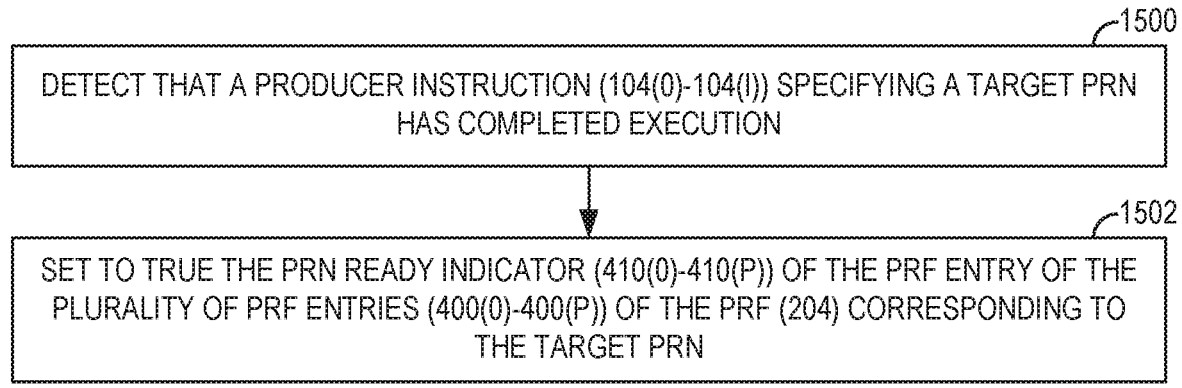
FIG. 15 is a flowchart illustrating exemplary operations of the register management circuit of FIGS. 1 and 2 for tracking the ready state of PRNs.

FIG. 15 illustrates exemplary operations of the register management circuit 126 of FIGS. 1 and 2 for tracking the ready state of PRNs. For the sake of clarity, elements of FIGS. 1, 2, and 4 are referenced in describing FIG. 15. Operations according to FIG. 15 begin with the register management circuit 126 detecting that a producer instruction specifying a target PRN (i.e., one of the instructions 104(0)-104(I) that generates data for storage in a physical register indicated by the target PRN) has completed execution (block 1500). In response, the register management circuit 126 sets to true the PRN ready indicator 410(0)-410(P) of the PRF entry of the plurality of PRF entries 400(0)-400(P) of the PRF 204 corresponding to the target PRN (block 1502). In this manner, the register management circuit 126 is able to maintain an accurate picture of PRNs having data for consumption by consumer instructions.

Figure 16:
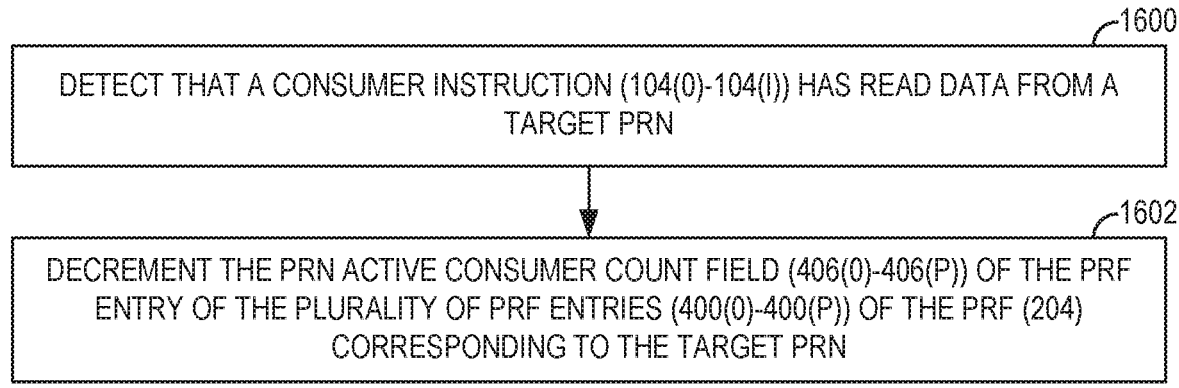
FIG. 16 is a flowchart illustrating exemplary operations of the register management circuit of FIGS. 1 and 2 for tracking the number of active consumers of a PRN.

To illustrate exemplary operations of the register management circuit 126 of FIGS. 1 and 2 for tracking the number of active consumer instructions of a PRN, FIG. 16 is provided. Elements of FIGS. 1, 2, and 4 are referenced in describing FIG. 16 for the sake of clarity. Operations according to FIG. 16 begin with the register management circuit 126 detecting that a consumer instruction 104(0)-104(I) (i.e., one of the instructions 104(0)-104(I) that accesses data for storage in a physical register indicated by a target PRN) has read data from the target PRN (block 1600). The register management circuit 126 then decrements the PRN active consumer count field 406(0)-406(P) of the PRF entry of the plurality of PRF entries 400(0)-400(P) of the PRF 204 corresponding to the target PRN (block 1602). The register management circuit 126 thus is able to maintain an updated count of the number of consumer instructions 104(0)-104(I) still waiting to access the data stored at the physical register indicated by the target PRN.

Figure 17:
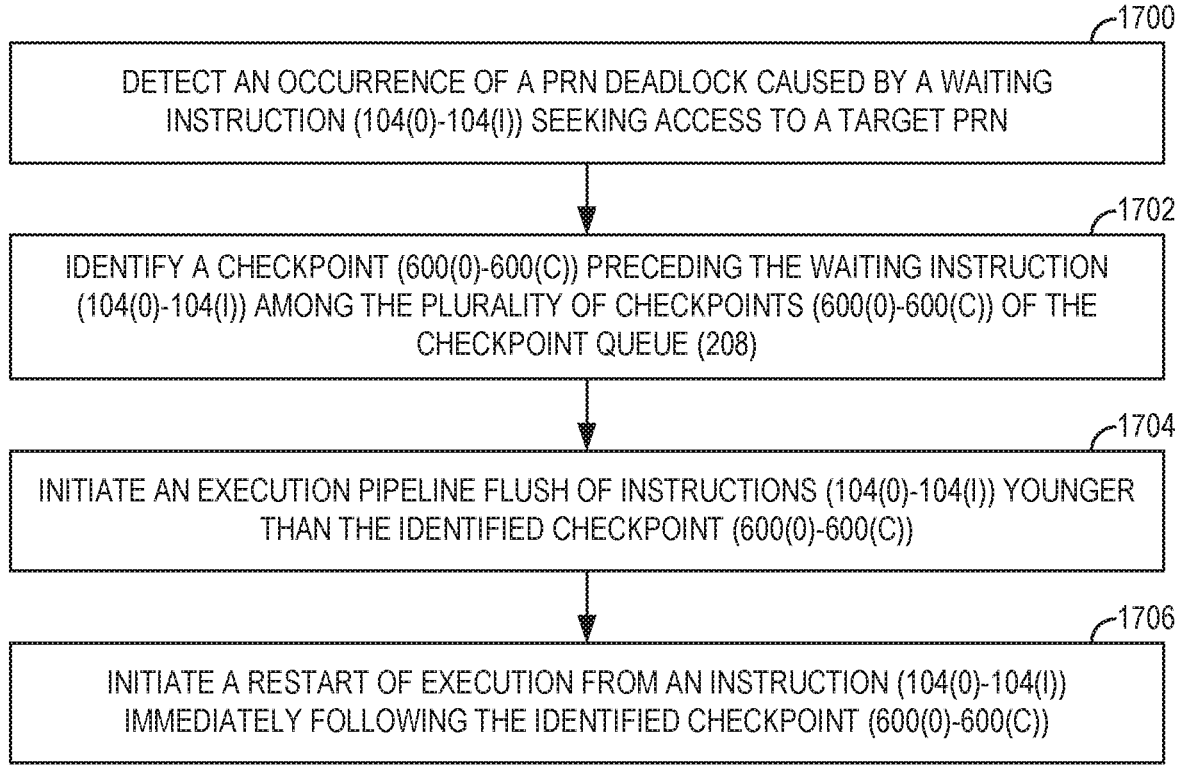
FIG. 17 is a flowchart illustrating exemplary operations of the register management circuit of FIGS. 1 and 2 for handling deadlocks caused by a waiting instruction seeking access to a target PRN.

FIG. 17 illustrates exemplary operations of the register management circuit 126 of FIGS. 1 and 2 for handling deadlocks caused by a waiting instruction, such as one of the instructions 104(0)-104(I) seeking access to a target PRN. For the sake of clarity, elements of FIGS. 1, 2, and 6 are referenced in describing FIG. 17. In FIG. 17, operations begin with the register management circuit 126 detecting an occurrence of a PRN deadlock caused by a waiting instruction 104(0)-104(I) seeking access to a target PRN (block 1700), Detecting the occurrence of the PRN deadlock may be based, e.g., on data received by the register management circuit 126 from the execution pipeline 112 of the OOP 102 of FIG. 1. The register management circuit 126 then identifies a checkpoint 600(0)-600(C) preceding the waiting instruction 104(0)-104(I) among the plurality of checkpoints 600(0)-600(C) of the checkpoint queue 208 (block 1702). The register management circuit 126 initiates an execution pipeline flush of instructions 104(0)-104(I) younger than the identified checkpoint 600(0)-600(C) (block 1704). Finally, the register management circuit 126 initiates a restart of execution from an instruction 104(0)-104(I) immediately following the identified checkpoint 600(0)-600(C) (block 1706).

Providing late physical register allocation and early physical register release in OOP-based devices implementing a checkpoint-based architecture according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 18:
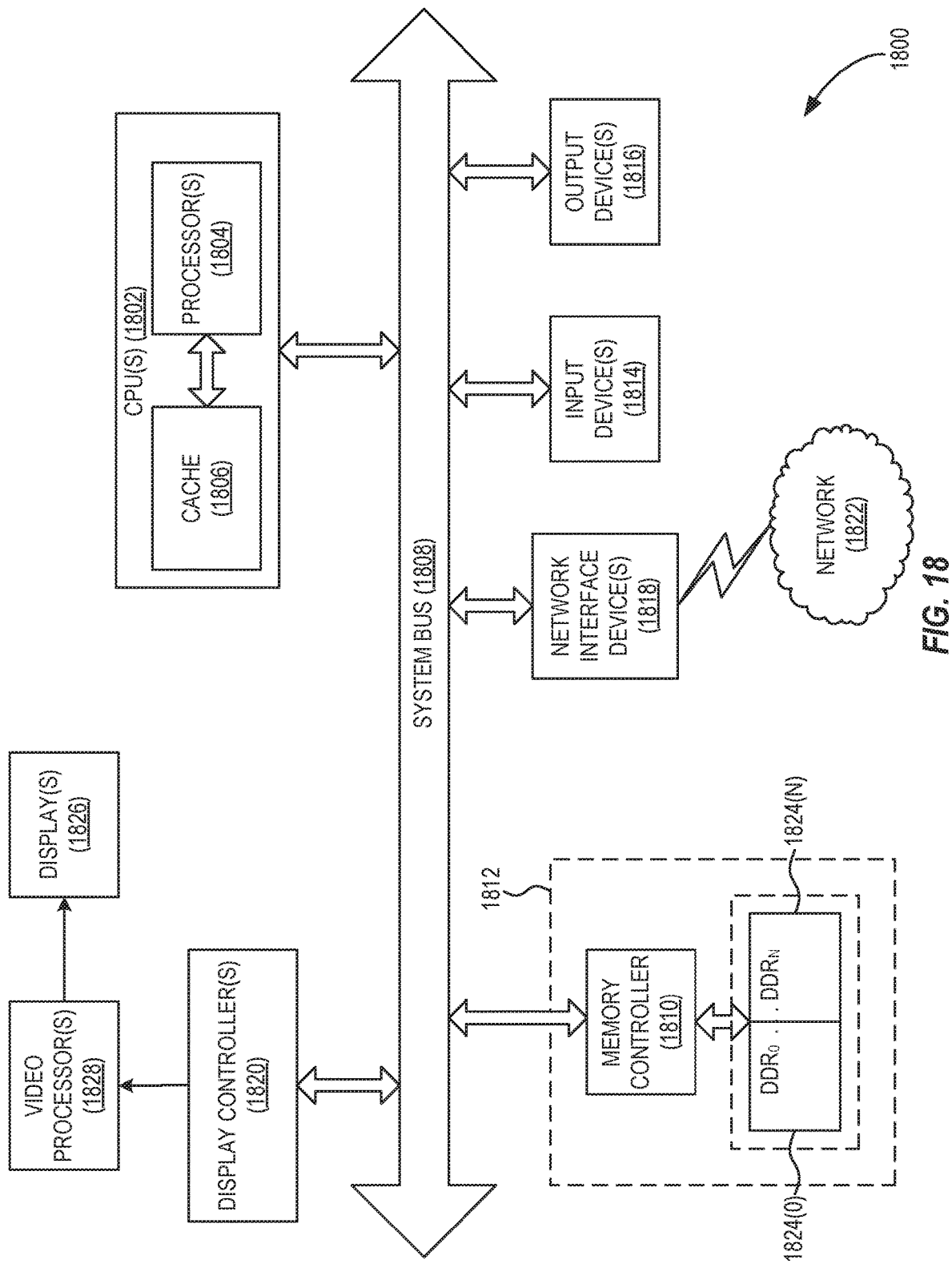
FIG. 18 is a block diagram of an exemplary processor-based system that can include the OOP-based device of FIG. 1.

In this regard, FIG. 18 illustrates an example of a processor-based system 1800 that may correspond to the OOP-based device 100 of FIG. 1. The processor-based system 1800 includes one or more central processing units (CPUs) 1802, each including one or more processors 1804 (which in some aspects may correspond to the OOP 102 of FIG. 1). The CPU(s) 1802 may have cache memory 1806 coupled to the processor(s) 1804 for rapid access to temporarily stored data. The CPU(s) 1802 is coupled to a system bus 1808 and can intercouple master and slave devices included in the processor-based system 1800. As is well known, the CPU(s) 1802 communicates with these other devices by exchanging address, control, and data information over the system bus 1808. For example, the CPU(s) 1802 can communicate bus transaction requests to a memory controller 1810 as an example of a slave device.

Other master and slave devices can be connected to the system bus 1808. As illustrated in FIG. 18, these devices can include a memory system 1812, one or more input devices 1814, one or more output devices 1816, one or more network interface devices 1818, and one or more display controllers 1820, as examples. The input device(s) 1814 can include any type of input device, including but not limited to input keys, switches, voice processors, etc. The output device(s) 1816 can include any type of output device, including, but not limited to, audio, video, other visual indicators, etc. The network interface device(s) 1818 can be any devices configured to allow exchange of data to and from a network 1822. The network 1822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1818 can be configured to support any type of communications protocol desired. The memory system 1812 can include one or more memory units 1824(0)-1824(N).

The CPU(s) 1802 may also be configured to access the display controllers) 1820 over the system bus 1808 to control information sent to one or more displays 1826. The display controller(s) 1820 sends information to the display(s) 1826 to be displayed via one or more video processors 1828, which process the information to be displayed into a format suitable for the display(s) 1826. The display(s) 1826 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An out-of-order processor (OOP)-based device implementing a checkpoint-based microarchitecture, the OOP-based device comprising an OOP comprising:
    an execution pipeline comprising a plurality of processing stages; and
    a register management circuit communicatively coupled to the execution pipeline and comprising:
        a most recent table (MRT) comprising a plurality of MRT entries each comprising a virtual register number (VRN) field, a physical register number (PRN) field, and a valid PRN indicator;
        a physical register file (PRF) comprising a plurality of PRF entries each corresponding to a PRN and comprising a PRN active checkpoint count field;
        a virtual register file (VRF) comprising a plurality of VRF entries each corresponding to a VRN and comprising a VRN active checkpoint count field; and
        a checkpoint queue comprising a first-in-first-out (FIFO) queue configured to store a plurality of checkpoints each comprising an MRT snapshot;
    the register management circuit configured to:
        determine whether a checkpoint creation criteria is satisfied; and
        responsive to determining that the checkpoint creation criteria is satisfied:
            create a checkpoint comprising an MRT snapshot in the checkpoint queue;
            increment the VRN active checkpoint count field of the plurality of VRF entries of the VRF for each VRN field indicated by the plurality of MRT entries of the MRT; and
            increment the PRN active checkpoint count field of the plurality of PRF entries of the PRF for each PRN field indicated by the plurality of MRT entries of the MRT having a valid PRN indicator set to true.

2. The OOP-based device of claim 1, wherein the register management circuit is configured to determine whether the checkpoint creation criteria is satisfied by being configured to:
    determine whether a low-confidence branch is being executed; and
    responsive to determining that the low-confidence branch is being executed, determine whether a number of instructions since a most recent checkpoint exceeds a minimum instruction count threshold, and a total number of checkpointed PRNs does not exceed a maximum checkpoint count threshold.

3. The OOP-based device of claim 2, wherein the register management circuit is further configured to:
    calculate a branch mispredictions per thousand instructions (PKI) rate;
    decrement the minimum instruction count threshold responsive to the branch mispredictions PKI rate exceeding a maximum branch misprediction threshold; and
    increment the minimum instruction count threshold responsive to the branch mispredictions PKI rate falling below a minimum branch misprediction threshold.

4. The OOP-based device of claim 2, wherein the register management circuit is configured to determine whether the low-confidence branch is being executed based on one or more of a branch predictor counter and a dedicated branch confidence estimator circuit.

5. The OOP-based device of claim 1, wherein the register management circuit is configured to determine whether the checkpoint creation criteria is satisfied by being configured to determine whether a conditional branch instruction is detected within a maximum instruction count threshold since a most recent checkpoint.

6. The OOP-based device of claim 1, wherein the register management circuit is configured to determine whether the checkpoint creation criteria is satisfied by being configured to determine, during re-execution from a previous checkpoint resulting from a mispredicted branch instruction, whether a conditional branch instruction is detected following the mispredicted branch instruction.

7. The OOP-based device of claim 1, wherein:
    the register management circuit further comprises a VRN obsolete list and a PRN obsolete list, each comprising a FIFO queue; and
    the register management circuit is further configured to:
        determine whether an oldest checkpoint in the checkpoint queue is eligible for release; and
        responsive to determining that the oldest checkpoint in the checkpoint queue is eligible for release:
            decrement the VRN active checkpoint count field of the plurality of VRF entries of the VRF for each VRN field indicated by the plurality of MRT entries of the oldest checkpoint;
            add a VRN for each VRN field indicated by the plurality of MRT entries of the oldest checkpoint having a VRN active checkpoint count field with a value of zero (0) to the VRN obsolete list;
            decrement the PRN active checkpoint count field of the plurality of PRF entries of the PRF for each PRN field indicated by the plurality of MRT entries of the oldest checkpoint having a valid PRN indicator set to true;

add a PRN for each PRN field indicated by the plurality of MRT entries of the oldest checkpoint having a PRN active checkpoint count field with a value of zero (0) to the PRN obsolete list; and remove the oldest checkpoint from the checkpoint queue.

8. The OOP-based device of claim 7, wherein the register management circuit is configured to determine whether the oldest checkpoint in the checkpoint queue is eligible for release by being configured to:

determine whether a next-younger checkpoint exists within the checkpoint queue; and responsive to determining that the next-younger checkpoint exists within the checkpoint queue, determine whether all instructions between the next-younger checkpoint and the oldest checkpoint are confirmed not to flush.

9. The OOP-based device of claim 7, wherein:

the execution pipeline comprises a plurality of reservation stations;

the plurality of PRF entries of the PRF each further comprises a PRN active consumer count field;

the plurality of VRF entries of the VRF each further comprises a VRN active consumer count field; and the register management circuit is further configured to:

detect an instruction accessing a source register using a source logical register number (LRN);

retrieve a source MRT entry of the plurality of MRT entries of the MRT corresponding to the source LRN;

determine whether the valid PRN indicator of the source MRT entry is set;

responsive to determining that the valid PRN indicator of the source MRT entry is set:

assign a value of the PRN field of the source MRT entry to the instruction for later use in the execution pipeline; and increment the PRN active consumer count field of the PRF entry of the plurality of PRF entries corresponding to the PRN field of the source MRT entry; and responsive to determining that the valid PRN indicator of the source MRT entry is not set:

assign a value of the VRN field of the source MRT entry to the instruction for later use in a reservation station of the plurality of reservation stations; and increment the VRN active consumer count field of the VRF entry of the plurality of VRF entries corresponding to the VRN field of the source MRT entry.

10. The OOP-based device of claim 9, wherein:

the plurality of PRF entries of the PRF each further comprises an PRN-MRT mapped indicator;

the plurality of VRF entries of the VRF each further comprises a VRN-MRT mapped indicator; and the register management circuit is further configured to:

detect an instruction accessing a destination register using a destination LRN;

retrieve a destination MRT entry of the plurality of MRT entries of the MRT corresponding to the destination LRN;

set to false the VRN-MRT mapped indicator of the VRF entry of the plurality of VRF entries corresponding to the VRN field of the destination MRT entry;

set to false the PRN-MRT mapped indicator of the PRF entry of the plurality of PRF entries corresponding to the PRN field of the destination MRT entry and having a valid PRN indicator set to true;

allocate a destination VRN;

update the VRN field of the destination MRT entry to store the destination VRN;

set to false the valid PRN indicator for the destination MRT entry; and assign a value of the VRN field of the destination MRT entry to the instruction for later use in the execution pipeline.

11. The OOP-based device of claim 10, wherein the register management circuit is further configured to:

determine, with respect to the VRF entry of the plurality of VRF entries corresponding to the VRN field of the destination MRT entry, whether the VRN-MRT mapped indicator is set to false and the VRN active checkpoint count field equals zero (0);

responsive to determining that the VRN-MRT mapped indicator is set to false and the VRN active checkpoint count field equals zero (0), add the VRN corresponding to the VRN field of the destination MRT entry to the VRN obsolete list.

12. The OOP-based device of claim 10, wherein the register management circuit is further configured to:

determine, with respect to the PRF entry of the plurality of PRF entries corresponding to the PRN field of the destination MRT entry, whether the PRN-MRT mapped indicator is set to false and the PRN active checkpoint count field equals zero (0); and responsive to determining that the PRN-MRT mapped indicator is set to false and the PRN active checkpoint count field equals zero (0), add the PRN corresponding to the PRN field of the destination MRT entry to the PRN obsolete list.

13. The OOP-based device of claim 10, wherein:

the plurality of PRF entries of the PRF each further comprises a PRN ready indicator;

the plurality of VRF entries of the VRF each further comprises a VRN ready indicator; and the register management circuit is further configured to:

allocate a destination PRN for the destination VRN;

broadcast the destination PRN and the destination VRN to the plurality of reservation stations;

copy the VRN active consumer count field from the VRF entry of the plurality of VRF entries corresponding to the destination VRN to the PRN active consumer count field of the PRF entry of the plurality of PRF entries corresponding to the destination PRN;

copy the VRN active checkpoint count field from the VRF entry of the plurality of VRF entries corresponding to the destination VRN to the PRN active checkpoint count field of the PRF entry of the plurality of PRF entries corresponding to the destination PRN;

broadcast the destination PRN and the destination VRN to the MRT;

broadcast the destination PRN and the destination VRN to the checkpoint queue; and set to true the VRN ready indicator of the VRF entry of the plurality of VRF entries corresponding to the destination VRN.

14. The OOP-based device of claim 13, wherein the register management circuit is further configured to broadcast the destination PRN and the destination VRN to the MRT by being configured to:
  determine, for each MRT entry of the plurality of MRT entries of the MRT, whether the VRN field of the MRT entry matches the destination VRN;
  responsive to determining that the VRN field of the MRT entry matches the destination VRN:
    set the value of the PRN field of the MRT entry to the destination PRN;
    set to true the valid PRN indicator of the MRT entry; and
    set to true the PRN-MRT mapped indicator of the PRF entry of the plurality of PRF entries corresponding to the destination PRN; and
  responsive to determining that the VRN field of the VRN entry does not match the destination VRN:
    set to false the PRN-MRT mapped indicator of the PRF entry of the plurality of PRF entries corresponding to the destination PRN;
    determine whether the PRN active checkpoint count field of the PRF entry of the plurality of PRF entries corresponding to the destination PRN equals zero (0); and
    responsive to determining that the PRN active checkpoint count field equals zero (0), add the destination PRN to the PRN obsolete list.

15. The OOP-based device of claim 13, wherein the register management circuit is further configured to broadcast the destination PRN and the destination VRN to the checkpoint queue by being configured to:
  determine, for each checkpoint of the plurality of checkpoints of the checkpoint queue, whether the checkpoint contains a VRN field matching the destination VRN; and
  responsive to determining that the checkpoint contains the VRN field matching the destination VRN:
    determine whether the valid PRN indicator of the MRT entry of the checkpoint containing the VRN field is set to false;
    responsive to determining that the valid PRN indicator of the MRT entry of the checkpoint containing the VRN field is set to false, store the destination PRN in the PRN field of the MRT entry of the checkpoint containing the VRN field matching the destination VRN; and
    set to true the valid PRN indicator of the MRT entry of the checkpoint containing the VRN field matching the destination VRN.

16. The OOP-based device of claim 13, wherein:
  the register management circuit further comprises a VRN free list comprising a FIFO queue; and
  the register management circuit is further configured to:
    identify one or more VRNs that are present within the VRN obsolete list and that correspond to a VRF entry of the plurality of VRF entries of the VRF having a VRN ready indicator set to true; and
    for each VRN of the one or more VRNs:
      remove the VRN from the VRN obsolete list; and
      add the VRN to the VRN free list.

17. The OOP-based device of claim 13, wherein:
  the register management circuit further comprises a PRN free list comprising a FIFO queue; and
  the register management circuit is further configured to:
    identify one or more PRNs that are present within the PRN obsolete list and that correspond to a PRF entry of the plurality of PRF entries of the PRF having a PRN ready indicator set to true and a PRN active consumer count field equaling zero (0); and
    for each PRN of the one or more PRNs:
      remove the PRN from the PRN obsolete list; and
      add the PRN to the PRN free list.

18. The OOP-based device of claim 13, wherein the register management circuit is further configured to:
  detect that a producer instruction specifying a target PRN has completed execution; and
  set to true the PRN ready indicator of the PRF entry of the plurality of PRF entries of the PRF corresponding to the target PRN.

19. The OOP-based device of claim 13, wherein the register management circuit is further configured to:
  detect that a consumer instruction has read data from a target PRN; and
  decrement the PRN active consumer count field of the PRF entry of the plurality of PRF entries of the PRF corresponding to the target PRN.

20. The OOP-based device of claim 13, wherein the register management circuit is further configured to:
  detect an occurrence of a PRN deadlock caused by a waiting instruction seeking access to a target PRN;
  identify a checkpoint preceding the waiting instruction among the plurality of checkpoints of the checkpoint queue;
  initiate an execution pipeline flush of instructions younger than the identified checkpoint; and
  initiate a restart of execution from an instruction immediately following the identified checkpoint.

21. The OOP-based device of claim 1, integrated into an integrated circuit (IC).

22. The OOP-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

23. A method for providing late register allocation in an out-of-order processor (OOP)-based device implementing a checkpoint-based microarchitecture, comprising:
  determining, by a register management circuit of an OOP of the OOP-based device, whether a checkpoint creation criteria is satisfied, wherein the register management circuit comprises:
    a most recent table (MRT) comprising a plurality of MRT entries each comprising a virtual register number (VRN) field, a physical register number (PRN) field, and a valid PRN indicator;
    a physical register file (PRF) comprising a plurality of PRF entries each corresponding to a PRN and comprising a PRN active checkpoint count field;

a virtual register file (VRF) comprising a plurality of VRF entries each corresponding to a VRN and comprising a VRN active checkpoint count field; and a checkpoint queue comprising a first-in-first-out (FIFO) queue configured to store a plurality of checkpoints each comprising an MRT snapshot; and responsive to determining that the checkpoint creation criteria is satisfied:

creating a checkpoint comprising an MRT snapshot in the checkpoint queue;

incrementing the VRN active checkpoint count field of the plurality of VRF entries of the VRF for each VRN field indicated by the plurality of MRT entries of the MRT; and incrementing the PRN active checkpoint count field of the plurality of PRF entries of the PRF for each PRN field indicated by the plurality of MRT entries of the MRT having a valid PRN indicator set to true.

24. The method of claim 23, wherein determining whether the checkpoint creation criteria is satisfied comprises:

determining whether a low-confidence branch is being executed; and responsive to determining that the low-confidence branch is being executed, determining whether a number of instructions since a most recent checkpoint exceeds a minimum instruction count threshold, and a total number of checkpointed PRNs does not exceed a maximum checkpoint count threshold.

25. The method of claim 24, further comprising:

calculating a branch mispredictions per thousand instructions (PKI) rate;

decrementing the minimum instruction count threshold responsive to the branch mispredictions PKI rate exceeding a maximum branch misprediction threshold; and incrementing the minimum instruction count threshold responsive to the branch mispredictions PKI rate falling below a minimum branch misprediction threshold.

26. The method of claim 24, wherein determining whether the low-confidence branch is being executed is based on one or more of a branch predictor counter and a dedicated branch confidence estimator circuit.

27. The method of claim 23, wherein determining whether the checkpoint creation criteria is satisfied comprises determining whether a conditional branch instruction is detected within a maximum instruction count threshold since a most recent checkpoint.

28. The method of claim 23, wherein determining whether the checkpoint creation criteria is satisfied comprises determining, during re-execution from a previous checkpoint resulting from a mispredicted branch instruction, whether a conditional branch instruction is detected following the mispredicted branch instruction.

29. The method of claim 23, wherein:

the register management circuit further comprises a VRN obsolete list and a PRN obsolete list, each comprising a FIFO queue; and the method further comprises:

determining whether an oldest checkpoint in the checkpoint queue is eligible for release; and responsive to determining that the oldest checkpoint in the checkpoint queue is eligible for release:

decrementing the VRN active checkpoint count field of the plurality of VRF entries of the VRF for each VRN field indicated by the plurality of MRT entries of the oldest checkpoint;

adding a VRN for each VRN field indicated by the plurality of MRT entries of the oldest checkpoint having a VRN active checkpoint count field with a value of zero (0) to the VRN obsolete list;

decrementing the PRN active checkpoint count field of the plurality of PRF entries of the PRF for each PRN field indicated by the plurality of MRT entries of the oldest checkpoint having a valid PRN indicator set to true;

adding a PRN for each PRN field indicated by the plurality of MRT entries of the oldest checkpoint having a PRN active checkpoint count field with a value of zero (0) to the PRN obsolete list; and removing the oldest checkpoint from the checkpoint queue.

30. The method of claim 29, wherein determining whether the oldest checkpoint in the checkpoint queue is eligible for release comprises:

determining whether a next-younger checkpoint exists within the checkpoint queue; and responsive to determining that the next-younger checkpoint exists within the checkpoint queue, determining whether all instructions between the next-younger checkpoint and the oldest checkpoint are confirmed not to flush.

31. The method of claim 29, wherein:

the OOP comprises an execution pipeline comprising a plurality of reservation stations;

the plurality of PRF entries of the PRF each further comprises a PRN active consumer count field;

the plurality of VRF entries of the VRF each further comprises a VRN active consumer count field; and the method further comprises:

detecting an instruction accessing a source register using a source logical register number (LRN);

retrieving a source MRT entry of the plurality of MRT entries of the MRT corresponding to the source LRN;

determine whether the valid PRN indicator of the source MRT entry is set;

responsive to determining that the valid PRN indicator of the source MRT entry is set:

assigning a value of the PRN field of the source MRT entry to the instruction for later use in the execution pipeline; and incrementing the PRN active consumer count field of the PRF entry of the plurality of PRF entries corresponding to the PRN field of the source MRT entry; and responsive to determining that the valid PRN indicator of the source MRT entry is not set:

assigning a value of the VRN field of the source MRT entry to the instruction for later use in a reservation station of the plurality of reservation stations; and incrementing the VRN active consumer count field of the VRF entry of the plurality of VRF entries corresponding to the VRN field of the source MRT entry.

32. The method of claim 31, wherein:

the plurality of PRF entries of the PRF each further comprises an PRN-MRT mapped indicator;

the plurality of VRF entries of the VRF each further comprises a VRN-MRT mapped indicator; and the method further comprises:

detecting an instruction accessing a destination register using a destination LRN;

retrieving a destination MRT entry of the plurality of MRT entries of the MRT corresponding to the destination LRN;

setting to false the VRN-MRT mapped indicator of the VRF entry of the plurality of VRF entries corresponding to the VRN field of the destination MRT entry;

setting to false the PRN-MRT mapped indicator of the PRF entry of the plurality of PRF entries corresponding to the PRN field of the destination MRT entry and having a valid PRN indicator set to true;

allocating a destination VRN;

updating the VRN field of the destination MRT entry to store the destination VRN;

setting to false the valid PRN indicator for the destination MRT entry; and assigning a value of the VRN field of the destination MRT entry to the instruction for later use in the execution pipeline.

33. The method of claim 32, further comprising:

determining, with respect to the VRF entry of the plurality of VRF entries corresponding to the VRN field of the destination MRT entry, whether the VRN-MRT mapped indicator is set to false and the VRN active checkpoint count field equals zero (0);

responsive to determining that the VRN-MRT mapped indicator is set to false and the VRN active checkpoint count field equals zero (0), adding the VRN corresponding to the VRN field of the destination MRT entry to the VRN obsolete list.

34. The method of claim 32, further comprising:

determining, with respect to the PRF entry of the plurality of PRF entries corresponding to the PRN field of the destination MRT entry, whether the PRN-MRT mapped indicator is set to false and the PRN active checkpoint count field equals zero (0); and responsive to determining that the PRN-MRT mapped indicator is set to false and the PRN active checkpoint count field equals zero (0), adding the PRN corresponding to the PRN field of the destination MRT entry to the PRN obsolete list.

35. The method of claim 32, wherein:

the plurality of PRF entries of the PRF each further comprises a PRN ready indicator;

the plurality of VRF entries of the VRF each further comprises a VRN ready indicator; and the method further comprises:

allocating a destination PRN for the destination VRN;

broadcasting the destination PRN and the destination VRN to the plurality of reservation stations;

copying the VRN active consumer count field from the VRF entry of the plurality of VRF entries corresponding to the destination VRN to the PRN active consumer count field of the PRF entry of the plurality of PRF entries corresponding to the destination PRN;

copying the VRN active checkpoint count field from the VRF entry of the plurality of VRF entries corresponding to the destination VRN to the PRN active checkpoint count field of the PRF entry of the plurality of PRF entries corresponding to the destination PRN;

broadcasting the destination PRN and the destination VRN to the MRT;

broadcasting the destination PRN and the destination VRN to the checkpoint queue; and setting to true the VRN ready indicator of the VRF entry of the plurality of VRF entries corresponding to the destination VRN.

36. The method of claim 35, wherein broadcasting the destination PRN and the destination VRN to the MRT comprises:

determining, for each MRT entry of the plurality of MRT entries of the MRT, whether the VRN field of the MRT entry matches the destination VRN;

responsive to determining that the VRN field of the MRT entry matches the destination VRN:

setting the value of the PRN field of the MRT entry to the destination PRN;

setting to true the valid PRN indicator of the MRT entry; and setting to true the PRN-MRT mapped indicator of the PRF entry of the plurality of PRF entries corresponding to the destination PRN; and responsive to determining that the VRN field of the VRN entry does not match the destination VRN:

setting to false the PRN-MRT mapped indicator of the PRF entry of the plurality of PRF entries corresponding to the destination PRN;

determining whether the PRN active checkpoint count field of the PRF entry of the plurality of PRF entries corresponding to the destination PRN equals zero (0); and responsive to determining that the PRN active checkpoint count field equals zero (0), adding the destination PRN to the PRN obsolete list.

37. The method of claim 35, wherein broadcasting the destination PRN and the destination VRN to the checkpoint queue comprises:

determining, for each checkpoint of the plurality of checkpoints of the checkpoint queue, whether the checkpoint contains a VRN field matching the destination VRN; and responsive to determining that the checkpoint contains a VRN field matching the destination VRN:

determining whether the valid PRN indicator of the MRT entry of the checkpoint containing the VRN field is set to false;

responsive to determining that the valid PRN indicator of the MRT entry of the checkpoint containing the VRN field is set to false, storing the destination PRN in the PRN field of the MRT entry of the checkpoint containing the VRN field matching the destination VRN; and setting to true the valid PRN indicator of the MRT entry of the checkpoint containing the VRN field matching the destination VRN.

38. The method of claim 35, wherein:

the register management circuit further comprises a VRN free list comprising a FIFO queue; and the method further comprises:

identifying one or more VRNs that are present within the VRN obsolete list and that correspond to a VRF entry of the plurality of VRF entries of the VRF having a VRN ready indicator set to true; and for each VRN of the one or more VRNs:

removing the VRN from the VRN obsolete list; and adding the VRN to the VRN free list.

39. The method of claim 35, wherein:

the register management circuit further comprises a PRN free list comprising a FIFO queue; and the method further comprises:
  identifying one or more PRNs that are present within the PRN obsolete list and that correspond to a PRF entry of the plurality of PRF entries of the PRF having a PRN ready indicator set to true and a PRN active consumer count field equaling zero (0); and
  for each PRN of the one or more PRNs:
    removing the PRN from the PRN obsolete list; and
    adding the PRN to the PRN free list.

40. The method of claim 35, further comprising:
detecting that a producer instruction specifying a target PRN has completed execution; and
setting to true the PRN ready indicator of the PRF entry of the plurality of PRF entries of the PRF corresponding to the target PRN.

41. The method of claim 35, further comprising:
detecting that a consumer instruction has read data from a target PRN; and
decrementing the PRN active consumer count field of the PRF entry of the plurality of PRF entries of the PRF corresponding to the target PRN.

42. The method of claim 35, further comprising:
detecting an occurrence of a PRN deadlock caused by a waiting instruction seeking access to a target PRN;
identifying a checkpoint preceding the waiting instruction among the plurality of checkpoints of the checkpoint queue;
performing an execution pipeline flush of instructions younger than the identified checkpoint; and
restarting execution from an instruction immediately following the identified checkpoint.

* * * * *